United States Patent
Nakamura et al.

(10) Patent No.: US 9,210,409 B2
(45) Date of Patent: Dec. 8, 2015

(54) THREE-DIMENSIONAL IMAGE DISPLAY APPARATUS AND IMAGE PROCESSING APPARATUS

(75) Inventors: Norihiro Nakamura, Kawasaki (JP); Rieko Fukushima, Tokyo (JP); Akira Morishita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 918 days.

(21) Appl. No.: 13/044,086

(22) Filed: Mar. 9, 2011

(65) Prior Publication Data

US 2012/0081358 A1    Apr. 5, 2012

(30) Foreign Application Priority Data

Sep. 30, 2010   (JP) .................................. 2010-222490

(51) Int. Cl.
  *H04N 13/04*   (2006.01)
  *H04N 21/44*   (2011.01)
(52) U.S. Cl.
  CPC ..... *H04N 13/0404* (2013.01); *H04N 21/44008* (2013.01)
(58) Field of Classification Search
  CPC ....................................................... G06T 15/00
  USPC ............................................................ 348/54
  See application file for complete search history.

(56) References Cited

U.S. PATENT DOCUMENTS

| | | | |
|---|---|---|---|
| 7,425,951 B2 * | 9/2008 | Fukushima et al. | 345/419 |
| 7,679,616 B2 * | 3/2010 | Nomura et al. | 345/419 |
| 8,384,772 B2 * | 2/2013 | Saishu et al. | 348/59 |
| 2003/0214459 A1 * | 11/2003 | Nishihara et al. | 345/6 |
| 2004/0021424 A1 * | 2/2004 | Pathak | 315/169.3 |
| 2004/0101162 A1 * | 5/2004 | Higaki et al. | 382/103 |

(Continued)

FOREIGN PATENT DOCUMENTS

| | | |
|---|---|---|
| JP | 2006-098779 | 4/2006 |
| JP | 3892808 | 12/2006 |

(Continued)

OTHER PUBLICATIONS

Notification of Reason for Rejection issued by the Japanese Patent Office on Sep. 11, 2012, for Japanese Patent Application No. 2010-222490, and English-language translation thereof.

(Continued)

*Primary Examiner* — Dave Czekaj
*Assistant Examiner* — Kehinde O Abimbola
(74) *Attorney, Agent, or Firm* — Finnegan, Henderson, Farabow, Garrett & Dunner, L.L.P.

(57) ABSTRACT

A three-dimensional image display apparatus according to an embodiments includes: an optical plate being capable of controlling light arrays from pixels of a plane display device by using a plurality of optical openings; a specification unit configured to read parallax information of a plurality of pixel groups each including a plurality of pixels in the plane image display device associated with each of the plurality of optical openings, specify two pixels adjacent to a boundary of the plurality of pixel groups, determine one of the two specified pixels to be a first pixel, and determine the other of the two specified pixels to be a second pixel; a processing unit configured to process to mix parallax information of the first pixel with parallax information of the second pixel; and a conversion unit configured to convert parallax information obtained by the processing unit to an image for three-dimensional image display.

12 Claims, 19 Drawing Sheets

(56) References Cited

U.S. PATENT DOCUMENTS

| | | | |
|---|---|---|---|
| 2004/0145708 A1* | 7/2004 | Tanner et al. | 353/94 |
| 2004/0150583 A1* | 8/2004 | Fukushima et al. | 345/6 |
| 2005/0083400 A1* | 4/2005 | Hirayama et al. | 348/14.07 |
| 2005/0244050 A1* | 11/2005 | Nomura et al. | 382/154 |
| 2005/0259323 A1* | 11/2005 | Fukushima et al. | 359/462 |
| 2006/0274156 A1* | 12/2006 | Rabbani et al. | 348/208.99 |
| 2007/0081208 A1* | 4/2007 | Chang et al. | 359/9 |
| 2008/0019612 A1* | 1/2008 | Koyanagi | 382/300 |
| 2008/0225113 A1* | 9/2008 | Saishu et al. | 348/51 |
| 2008/0309663 A1* | 12/2008 | Fukushima et al. | 345/419 |
| 2009/0102916 A1* | 4/2009 | Saishu et al. | 348/54 |
| 2009/0309873 A1* | 12/2009 | Saishu et al. | 345/419 |
| 2010/0033556 A1* | 2/2010 | Saishu et al. | 348/51 |
| 2011/0032339 A1* | 2/2011 | Hirayama et al. | 348/51 |

FOREIGN PATENT DOCUMENTS

| | | |
|---|---|---|
| JP | 2008-067092 | 3/2008 |
| JP | 2009-239665 | 10/2009 |

OTHER PUBLICATIONS

Notification of Reason for Rejection issued by the Japanese Patent Office on Sep. 11, 2012, for Japanese Patent Application No. 2010-22490, and English-language translation thereof.

* cited by examiner

THREE-DIMENSIONAL IMAGE DISPLAY APPARATUS AND IMAGE PROCESSING APPARATUS

CROSS-REFERENCE TO RELATED APPLICATION

This application is based upon and claims the benefit of priority from prior Japanese Patent Application No. 2010-222490 filed on Sep. 30, 2010 in Japan, the entire contents of which are incorporated herein by reference.

FIELD

Embodiments described herein relate generally to a three-dimensional image display apparatus and an image processing apparatus.

BACKGROUND

As auto three-dimensional image display apparatuses (hereafter referred to as three-dimensional image display apparatuses as well) which makes it possible to view a three-dimensional image without glasses, the multiview scheme, the dense multiview scheme, the integral imaging scheme (II scheme), and the one-dimensional II scheme (1D-II scheme: parallax information (pixel values of a parallax image) is displayed only in the horizontal direction) are known. These have a common structure that optical openings represented by a lens array are disposed on a front face of a flat panel display (FPD) represented by a liquid crystal display device (LCD). The optical openings are disposed at constant intervals, and a plurality of FPD pixels are assigned to each optical opening. In the present specification, a plurality of pixels assigned to each optical opening pupil is referred to as pixel group. The optical opening corresponds to a pixel of the three-dimensional image display apparatus, and a pixel seen via the optical opening is changed over according to the viewing location. In other words, the optical opening behaves as a three-dimensional image displaying pixel which changes in pixel information according to the viewing location.

In the three-dimensional image display apparatus having such a configuration, pixels on the FPD are finite. Therefore, there is a limitation in the number of pixels forming the pixel group as well. For example, there are pixels in the range of 2 to 64 pixels per direction. Especially the case of two pixels is referred to as two-view scheme. Therefore, it cannot be avoided that the range (viewing zone) in which a three-dimensional image can be viewed is limited. In addition, if a viewer deviates from the viewing zone to the left or right, it cannot be avoided to view a parallax image of a pixel group corresponding to an optical opening which is adjacent to the original optical opening. Since light rays viewed by a viewer at this time is a three-dimensional image formed by light rays passed through an optical opening adjacent to the original optical opening, the light ray direction does not coincide with parallax information and distortion is contained. Since the parallax image is changed over according to a movement of the viewing location, however, this is also seen as a three-dimensional image in this case as well. Each parallax image corresponds to a multiple viewpoint image picked up by using the display plane as the projection plane from a location of a converging point of light rays generated at a viewing distance L. In some cases, therefore, a zone where the three-dimensional image (overlapped multiple image) containing the distortion is seen is called side lobe.

A method of controlling the viewing zone of the auto three-dimensional image display apparatus by adjusting the number of pixels included in pixel groups assigned to optical openings is known. According to this technique, the number of pixels included in pixel groups is set equal to two values: n and (n+1) where n is a natural number of at least 2, and the appearance frequency of pixel groups each having (n+1) pixels is controlled.

In a transitional zone from a proper viewing zone to the side lobe, however, parallax images on both sides of a boundary between pixel groups are seen in a state in which the arrangement of parallaxes is inverted. It is known that consequently a phenomenon called pseudo-stereoscopy occurs and an image inverted in unevenness is viewed. Or parallax images on both sides of the boundary between pixel groups are seen at the same time. It is known that consequently videos to be seen at viewpoints which are originally different are seen overlapped resulting in a multiple image.

As one of counter methods against such an overlapped multiple image in the multiview three-dimensional image display apparatus, a technique for making it hard to perceive the overlapped multiple image by replacing a parallax image corresponding to a viewing zone boundary with an excessively smoothed blurred image is known.

As one of countermeasures against the problems described above caused by the overlapped multiple image, a technique of informing the viewer that the side lobe is not a proper image by, for example, displaying some warning image in a transitional zone from the viewing zone to a side lobe so as to be sensible although the sense of incongruity cannot be reduced is known.

It is known that a stripe-shaped breakup image is generated besides the above-described problems when the above-described method of controlling the viewing zone is used. As a countermeasure against this, a technique of suppressing the stripe-shaped breakup image by selecting a pixel on one side determined by whether it is located on the left or right side of the screen center, from parallax information of pixels located on both ends of a pixel group having (n+1) pixels, and mixing the parallax information of the pixel with parallax information of at least two pixels located at a distance of n pixels in a pixel direction adjacent to the pixel is known.

DETAILED DESCRIPTION

A three-dimensional image display apparatus according to an embodiment includes: a plane image display device including pixels arranged in a matrix form; an optical plate disposed so as to be opposed to the plane image display device, the optical plate being capable of controlling light arrays from the pixels by using a plurality of optical openings at the time of operation; a specification unit configured to read parallax information of a plurality of pixel groups each including a plurality of pixels in the plane image display device associated with each of the plurality of optical openings, specify two pixels adjacent to a boundary of the plurality of pixel groups, determine one of the two specified pixels to be a first pixel, and determine the other of the two specified pixels to be a second pixel; a processing unit configured to perform processing to mix parallax information of the first pixel with parallax information of the second pixel; and a conversion unit configured to convert parallax information obtained by the processing in the processing unit to an image for three-dimensional image display, the image for the three-dimensional image display being displayed by the plane image display device.

Prior to the description of embodiments, a difference between the II scheme and the multiview scheme and viewing zone optimization will now be described. Mainly one-dimension will be described because its description is easy. However, the present invention can be applied to two-dimension. Directions such as up, down, left, right, length and breadth in the ensuing description mean relative directions with the pitch direction of optical openings being defined as the breadth direction. Therefore, they do not necessarily coincide with absolute up, down, left, right, length and breadth directions obtained when the gravity direction in the real space is defined as the down direction.

Figure 1:
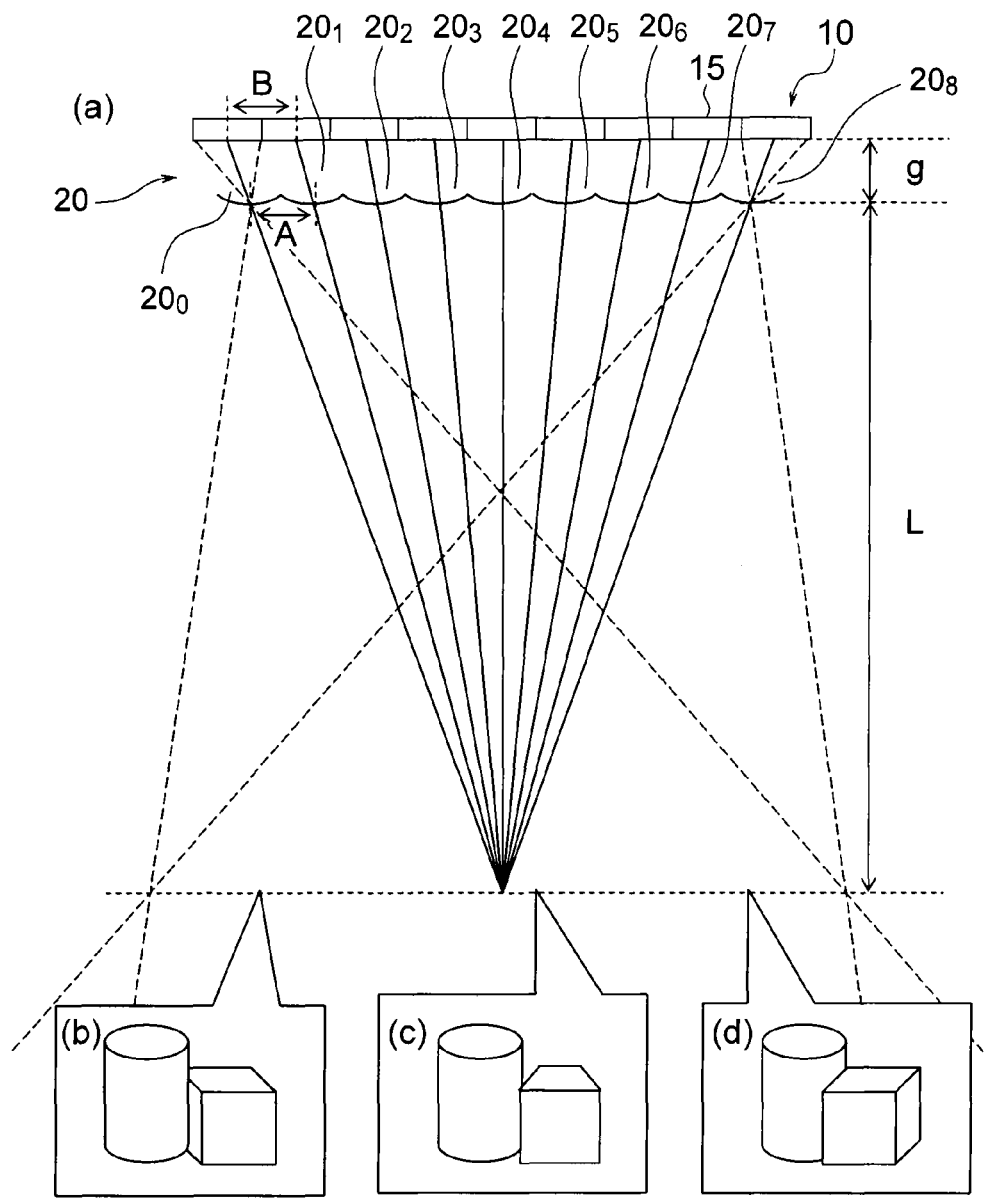
FIGS. 1(a) to 1(d) is a diagram for explaining an auto three-dimensional image display apparatus.

A horizontal section view of an auto three-dimensional image display apparatus is shown in FIG. 1(*a*). The three-dimensional image display apparatus includes a plane image display device 10 and an optical plate 20. The plane image display device 10 includes a plane image display unit (display panel) having pixels arranged in the length direction and the breadth direction to form a matrix, as in, for example, a liquid crystal display panel. The optical plate 20 includes a plurality of optical openings $20_0$ to $20_8$, and controls light ray supplied from the pixels. Each optical opening $20_i$ (i=0, ..., 8) is formed of, for example, a lens or slit. A plurality of pixels in the plane image display unit which are assigned to each optical opening are referred to as pixel group. In the three-dimensional image display apparatus, the pixel group means pixels of a three-dimensional image. In FIG. 1(*a*), eight three-dimensional images are seen because there are eight pixel groups.

FIG. 1(*a*) is a horizontal section view showing position relations between each optical opening $20_i$ (i=0, ..., 8) and a pixel group 15 corresponding to the optical opening. For light ray groups from all optical openings, i.e., the optical plate 20 to overlap at a finite distance L from each optical opening $20_i$ (i=0, ..., 8), the following expression should be satisfied $$A = B \times L/(L+g) \quad (1)$$

where A is a pitch of the optical openings, B is an average width of a pixel group corresponding to each optical opening, and g is a distance (gap) between the optical plate 20 and the plane image display device 10.

A multiview or dense multiview three-dimensional image display apparatus, which is an extension of the two-view scheme three-dimensional image display apparatus, is designed so as to cause light ray groups which have exited from all optical openings to incident on the same area at a location of a finite distance L from the optical plate 20. Specifically, every pixel group is formed of a definite number (n, where n≥2) pixels and the pitch A of optical openings is made slightly narrower than the width B of the pixel group. Denoting the pixel pitch by Pp, the following expression is obtained.

$$B = n \times Pp \quad (2)$$

From Expressions (1) and (2), design is performed to satisfy the following expression.

$$A = B \times L/(L+g) = (n \times Pp) \times L/(L+g) \quad (3)$$

In the present specification, L is referred to as viewing zone optimization distance. A scheme which adopts the design according to Expression (3) is referred to as multiview scheme. In this multiview scheme, however, it cannot be avoided that a converging point of light rays occurs at the distance L and light rays from a natural body cannot be regenerated. This is because in the multiview scheme both eyes are positioned at the converging point of light rays and a stereoscopic view is obtained by two-view scheme parallax. A distance L over which the range in which a three-dimensional image is visible becomes wider is fixed.

As a method for arbitrarily controlling the viewing distance without generating a converging point of light rays at the viewing distance with the aim of reproducing light rays more resembling light rays from an actual object, there is a design method of setting the pitch A of the optical openings according to the following expression.

$$A = n \times Pp \quad (4)$$

On the other hand, it is possible to satisfy Expression (1) by setting the number of pixels included in each pixel group at the finite distance L to two values: n and (n+1) and adjusting an occurrence frequency m (0≤m<1) of a pixel group having (n+1) pixels. In other words, m should be determined to satisfy the following expression from Expressions (1) and (4), $$B=(L+g)/L \times (n \times Pp)=(n \times Pp \times (1-m)+(n+1) \times Pp \times m)$$

i.e., $$(L+g)/L=(1-m)+(n+1)/n \times m \qquad (5)$$

For disposing the converging point of light rays behind the viewing distance L, design should be performed to cause an optical opening pitch A to satisfy the following expression based on Expressions (3) and (4)

$$(n \times Pp) \times L/(L+g) < A \leq n \times Pp \qquad (6)$$

Schemes in which the converging point of light rays is prevented from occurring at the viewing distance L are generally referred to as II scheme in the present specification. Its extreme configuration corresponds to Expression (4) in which the converging point of light rays is set to an infinite distance.

In the II scheme in which the converging point of light rays is generated behind the viewing distance L, the viewing zone optimization distance is located behind the viewing distance L provided that the number of pixels included in a pixel group is fixed to n. In the II scheme, therefore, a maximum viewing zone can be secured at the finite viewing distance L by setting the number of pixels included in pixel groups to two values: n and (n+1) and causing the average value B of the pixel group width to satisfy Expression (1). Hereafter, in the present specification, securing a maximum viewing zone at the finite viewing distance L is referred to as "viewing zone optimization is applied."

FIGS. 1(b), 1(c) and 1(d) are schematic horizontal section views showing how a three-dimensional image is seen in respective viewing locations at the viewing distance L. FIG. 1(b) shows an image seen from a right end zone at the viewing distance L. FIG. 1(c) shows an image seen from a central zone at the viewing distance L. FIG. 1(d) shows an image seen from a left end zone at the viewing distance L. Hereafter, the expression "viewing location" often appears. For simply describing phenomena, the location is described as a single point. This point corresponds to viewing with a single eye or a state in which an image is picked up with a single camera. As for the case where a person views with both eyes, it should be considered that the person views images having a parallax corresponding to the location difference equivalent to the spacing between eyes from two points set to the spacing between eyes. How a parallax image is seen is different according to whether the scheme is the multiview scheme or the II scheme. Hereafter, this will be described.

(Multiview Scheme)

Figure 2:
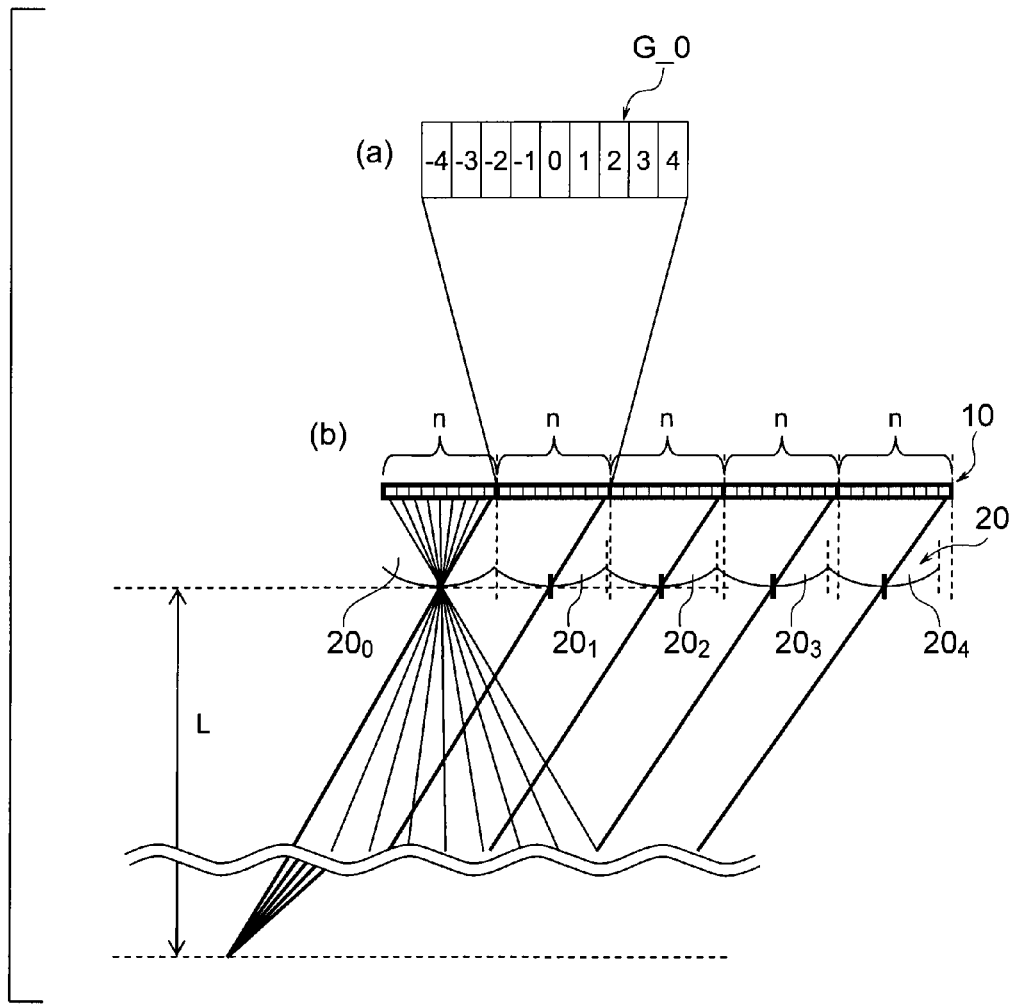
FIGS. 2(a) and 2(b) is a diagram for explaining a multiview scheme three-dimensional image display apparatus.

For the purpose of comparison, the multiview scheme will first be described. In the multiview scheme, a converging point of light rays is generated at the viewing zone optimization distance L as heretofore described. FIGS. 2(a) and 2(b) show horizontal sections of a multiview three-dimensional image display apparatus in the case of nine parallaxes. FIG. 2(a) shows pixel groups provided with parallax image numbers. FIG. 2(b) shows locations of incidence of light rays drawn from the location of the viewing distance L to respective optical openings, in the pixel groups. As shown in FIG. 2(a), the number of pixels included in a pixel group (G_0) associated with one of the optical openings is nine. Parallax images provided with numbers −4 to 4 are displayed on respective pixels. Light rays emitted from the right end pixel having the parallax image number 4 and passed through an optical opening $20_1$ are converged at the distance L. Stated reversely, viewing at the viewing zone optimization distance L, a pixel which displays a parallax image having the same parallax image number among pixels included in the pixel group (G_0) is expanded by all optical openings 20 and seen.

Figure 3:
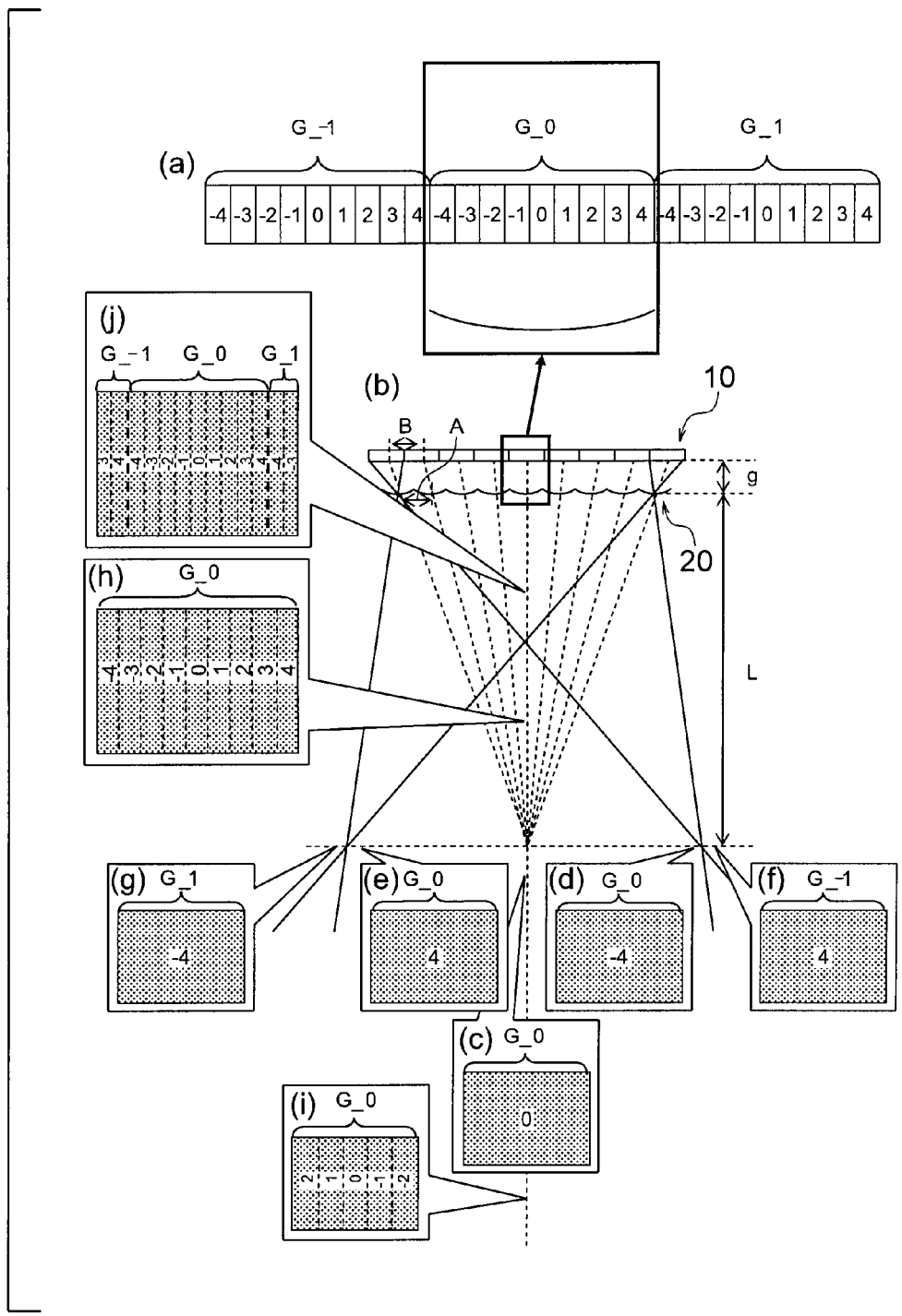
FIGS. 3(a) to 3(j) is a diagram showing a viewing position and parallax information which forms a display plane of a three-dimensional image display apparatus viewed from this position.

FIGS. 3(a) to 3(j) show a viewing location and parallax information (pixel values of parallax images) which forms a display face of the three-dimensional image display apparatus viewed from the location. FIG. 3(a) is a diagram showing pixel groups provided with parallax image numbers. FIG. 3(b) shows a relation between a pixel group average pitch B and an optical opening pitch A. FIG. 3(c) to FIG. 3(g) is a diagram showing parallax image numbers viewed when viewing at the viewing distance L. FIG. 3(h) to FIG. 3(j) is a diagram showing parallax image numbers viewed when viewing at a distance deviated from the viewing distance L. If viewing is performed from the center of the viewing zone width at the distance L, then a pixel viewed over all optical openings 20 becomes a pixel located at the center of the associated pixel group (G_0) and consequently the viewed parallax image number becomes 0 (FIG. 3(c)). If viewing is performed from the right end of the viewing zone, then a pixel viewed over all optical openings 20 becomes a pixel located at the left end of the associated pixel group (G_0) and consequently the viewed parallax image number becomes −4 (FIG. 3(d)). If viewing is performed from the left end of the viewing zone, then a pixel viewed over all optical openings 20 becomes a pixel located at the right end of the associated pixel group (G_0) and consequently the viewed parallax image number becomes 4 (FIG. 3(e)). In this way, any one of nine parallax images are seen according to a viewing location. By viewing these parallax images with both eyes, eight three-dimensional images shown in FIG. 1(b) to FIG. 1(c) are seen with changeover seven times.

In addition, if viewing is performed beyond the right viewing zone boundary, then a pixel viewed over all the optical openings 20 becomes a right end pixel not in the associated pixel group (G_0) but in a pixel group (G_−1) which is located on the left of the pixel group (G_0) so as to be adjacent thereto and consequently the viewed parallax image number becomes 4 which belongs to the pixel group (G_−1) (FIG. 3(f)). If the parallax image number 4 in the pixel group (G_−1) is viewed with a right eye and the parallax image number −4 in the pixel group (G_0) is viewed with a left eye, then pseudo-stereoscopy, i.e., an image inverted in unevenness is viewed.

If further movement to the right is performed, then the parallax image is changed over so as to become 3, 2, 1, . . . in parallax image number, and stereoscopic view also becomes possible. However, the display location shifts by one optical opening, and the breadth width of the screen viewed from the viewing location appears to be narrow as compared with when viewed from a proper viewing location in the viewing zone. This results in a three-dimensional image which is long in length. An image which has become long in length according to a change of the screen width is frequently seen in two-dimensional images. Therefore, the viewer is hard to be conscious of distortion. In general, therefore, a viewing zone of a three-dimensional image containing these distortions is called side lobe. This is included in the viewing zone in some cases. Also in the case where movement to the left is performed, a symmetric change is caused. However, description thereof will be omitted here.

On the other hand, if the viewer moves before or behind the viewing distance L and views, the parallax image number corresponding to a parallax image which forms the screen changes over in the range of the same pixel group (G_0). For example, the parallax image number becomes the range of −4 to 4 (FIG. 3(*h*)) or the range of 2 to −2 (FIG. 3(*i*)). In addition, if the viewing distance is extremely short or long, then it cannot be coped with in the same pixel group and parallax images of pixels in adjacent pixel groups are viewed in some cases (FIG. 3(*j*)).

Figure 4:
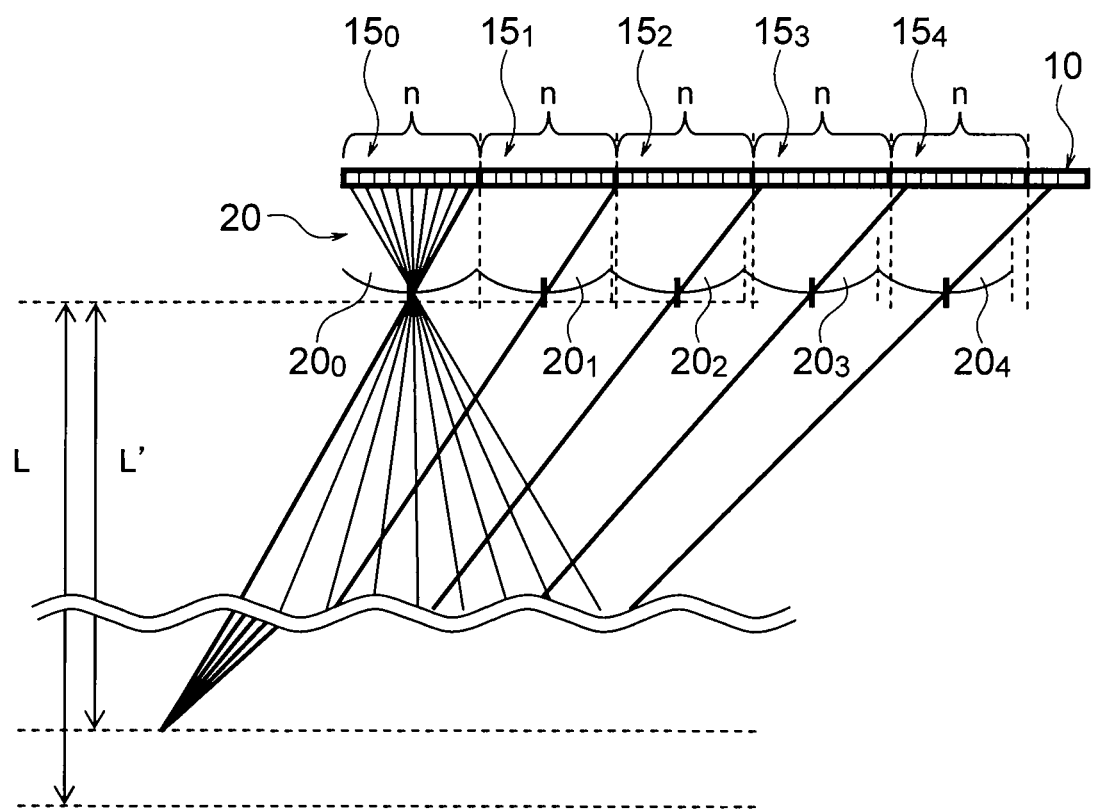
FIG. 4 is a diagram for explaining a multiview scheme three-dimensional image display apparatus.

FIG. 4 shows a horizontal section of the multiview three-dimensional image display apparatus in the case where the viewing distance L' has become shorter than the viewing zone optimization distance L (L'<L). If the viewing distance L' is shorter than the viewing zone optimization distance L, then the change of inclination of a light ray which extends from the location at the viewing distance L' through each optical opening $20_i$ (i=0, . . . , 4) becomes large and consequently the parallax image expanded by each optical opening $20_i$ (i=0, . . . , 4) changes continuously in the screen. As for leftmost pixel group $15_0$ in FIG. 4, a parallax image of a rightmost pixel in the pixel group $15_0$ associated with an optical opening $20_0$ passed through by a light ray is seen. As for a pixel group $15_1$ located on the right side of the leftmost pixel group $15_0$, however, a boundary between a parallax image of a right end pixel in the pixel group $15_1$ associated with a pixel group (G_0) for an optical opening $20_1$ passed through by a light ray and a parallax image of a left end pixel in a pixel group $15_2$ associated with a pixel group (G_1) for the optical opening $20_1$ adjacent to the pixel group (G_0) and associated with a pixel group (G_0) for an optical opening $20_2$ is seen. As for $15_2$, $15_3$ and $15_4$, a situation in which a parallax image of a left end pixel in the pixel group (G_1) adjacent to the pixel groups $15_2$, $15_3$ and $15_4$, associated with the pixel group (G_0) for optical openings $20_2$, $20_3$ and $20_4$ passed through by light rays is viewed is shown. For example, as for the pixel group $15_3$ located on the right of the pixel group $15_2$ so as to be adjacent thereto, the pixel group $15_3$ corresponds to the pixel group (G_0) for the optical opening $20_3$ located on the right of the optical opening $20_2$ passed through by a light ray so as to be adjacent thereto.

Heretofore, it has been described that the parallax image number or the pixel group changes over on the screen according to the change of the viewing distance. In the multiview scheme, a stereoscopic image is perceived by two-view scheme parallax at the viewing distance L as described hereafter as well. Therefore, it is desirable that a single parallax image is seen in each of the eyes. For causing the parallax information seen via an optical opening to be single, the focus of, for example, a lens included in the optical opening is narrowed down remarkably, or the aperture width of a slit or a pinhole included in the optical opening is narrowed down remarkably.

As a matter of course, the distance of the converging point of light rays is made to nearly coincide with the distance between eyes. In such a design, in a part where the viewed parallax image, i.e., the viewed pixel changes over in the screen as described before as a result of a forward or backward slight shift from the viewing distance, a non-pixel zone located at a boundary between pixels is viewed and the luminance falls. Furthermore, changeover to a parallax image having an adjacent parallax image number also looks discontinuous. In other words, a three-dimensional image cannot be viewed in a place other than the vicinity of the viewing zone optimization distance L.

(II Scheme)

Figure 5:
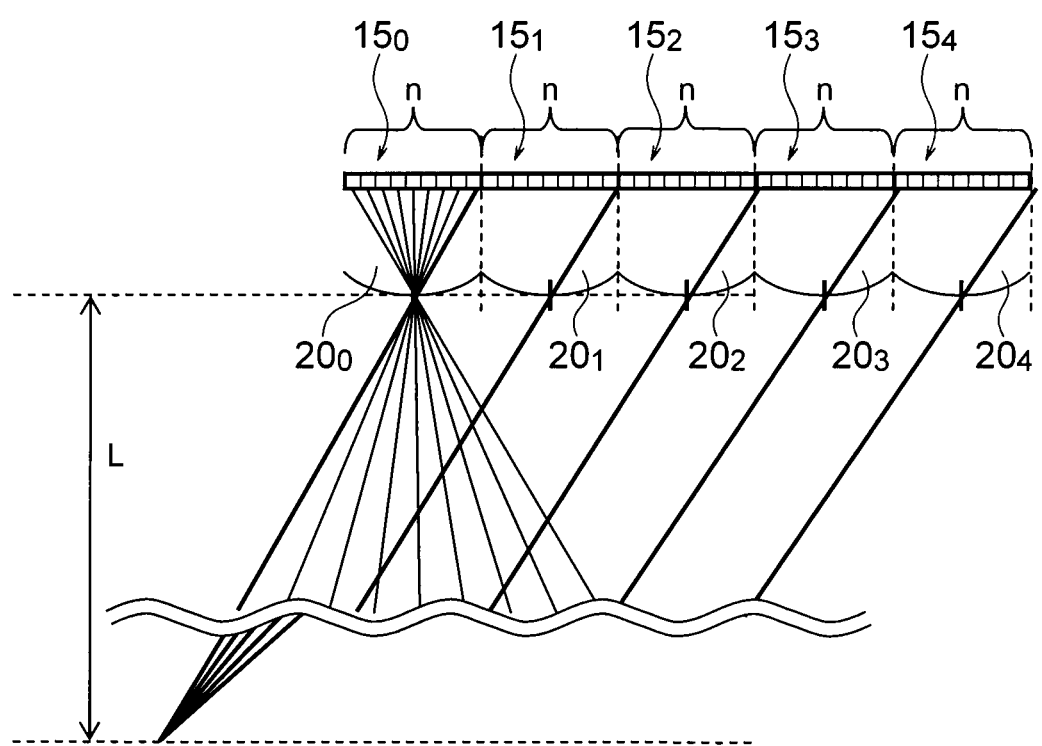
FIG. 5 is a diagram for explaining an II scheme three-dimensional image display apparatus.

The II scheme relating to the stereoscopic image display apparatuses according to embodiments will now be described. In the typical II scheme, the space of optical openings is set to n times the pixel width according to Expression (4). FIG. 5 shows a horizontal section view of an II scheme three-dimensional image display apparatus in the case where every pixel group is formed of n pixels, and locations of incidence of straight lines drawn from the location of the viewing distance L to respective optical openings, in the pixel groups. In the configuration of the II scheme shown in FIG. 5, every pixel group is formed of n pixels. In other words, FIG. 5 corresponds to the case where m=0 is set in Expression (5). In the pixel group (G_0), a light ray passed from the right end pixel in the leftmost pixel group $15_0$ through an optical opening $20_0$ is incident on the left end of the viewing zone at the viewing distance L. In other words, the right end pixel in the pixel group (G_0) is viewed. A line is drawn from this incidence location through an optical opening $20_1$ located further on the right in a perspective projection manner. As a result, the following is appreciated. Information seen through the optical opening $20_1$ becomes a boundary between a right end pixel in the pixel group $15_1$ associated with a pixel group (G_0) for an optical opening $20_1$ passed through and a left end pixel in a pixel group $15_2$ associated with an adjacent pixel group (G_1) for the optical opening $20_1$ and associated with a pixel group (G_0) for an optical opening $20_2$. In addition, information seen through the right optical opening $20_2$ becomes a left end pixel in a pixel group $15_3$ associated with the pixel group (G_1) for the optical opening $20_2$ and associated with the pixel group (G_0) for the optical opening $20_3$ (FIG. 5).

Figure 6:
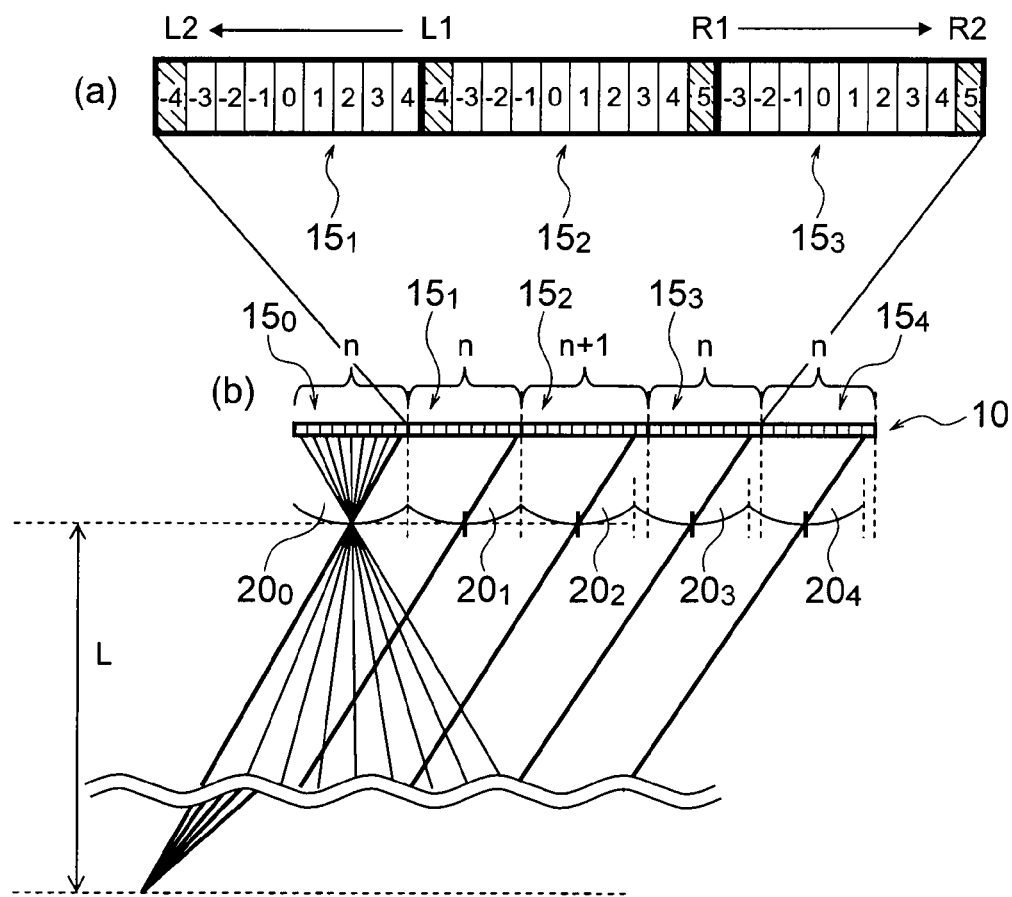
FIGS. 6(a) and 6(b) is a diagram for explaining an II scheme three-dimensional image display apparatus with viewing zone optimization applied.

FIGS. 6(*a*) and 6(*b*) show a horizontal section view of the II scheme three-dimensional image display apparatus in the case where the viewing zone optimization is applied. FIG. 6(*a*) is a diagram showing pixel groups provided with parallax image numbers. FIG. 6(*b*) is a diagram showing locations of incidence of straight lines drawn from the location of the viewing distance L to respective optical openings, in the pixel groups.

In FIGS. 6(*a*) and 6(*b*), pixel groups each having (n+1) pixels are disposed discretely while keeping hardware intact. When viewing from the left end of the viewing zone at a finite distance L, therefore, it becomes possible to view parallax information displayed on right end pixels in pixel groups $15_0$ to $15_4$ associated with all optical openings $20_0$ to $20_4$. In other words, the width in which the three-dimensional image can be viewed is maximized. The parallax image number in the II scheme is determined by relative locations of optical openings and pixels, and light rays which have exited from pixels displaying parallax images provided with the same parallax image number through optical openings become parallel. By providing the pixel group $15_2$ having (n+1) pixels, therefore, relative locations of optical openings and pixel groups are shifted by one pixel, and the parallax image number included in each pixel group also changes from a range −4 to 4 to a range −3 to 5, resulting in a change of inclination of a light ray group which exits from the optical opening (FIG. 6(*b*)).

Figure 7:
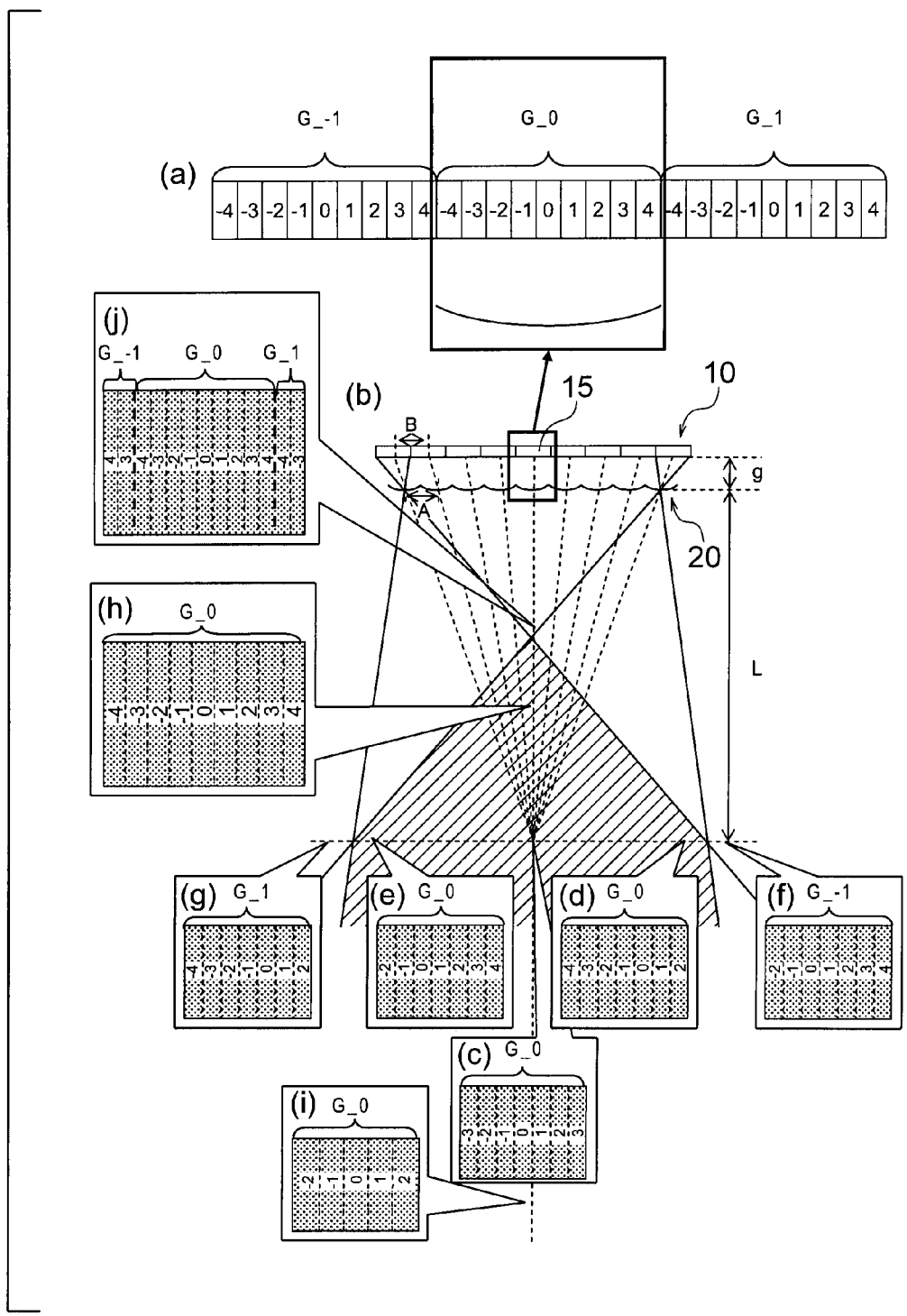
FIGS. 7(a) to 7(j) is a diagram for explaining parallax information viewed via an optical opening in the II scheme.

The II scheme is the same as the multiview scheme in that the viewing zone width can be maximized at the distance L. However, the II scheme is different from the multiview scheme in parallax information viewed via the optical opening. This situation will now be described with reference to FIGS. 7(*a*) to 7(*j*). FIG. 7(*a*) is a diagram showing pixel groups provided with parallax image numbers. FIG. 7(*b*) shows a relation between a pixel group average pitch B and an optical opening pitch A. FIG. 7(*c*) to FIG. 7(*g*) is a diagram showing parallax image numbers viewed at the viewing distance L. FIG. 7(*h*) to FIG. 7(*j*) is a diagram showing parallax image numbers viewed when viewing at a distance deviated from the viewing distance L.

In the multiview scheme, the parallax image number viewed through an optical opening is single in every pixel group when the viewer views from the viewing zone optimization distance L. In the II scheme, however, the parallax image number varies in the screen. Also in the case shown in FIGS. 6(a) and (b), a parallax image number 4 is viewed on the left side of the pixel group having (n+1) pixels, whereas a parallax image number 5 is viewed on the right side of the pixel group having (n+1) pixels. As shown in FIGS. 7(a) to 7(j), parallax images of parallax image numbers −3 to 3 are viewed in the screen in the center at the viewing zone optimization distance L (FIG. 7(c)), parallax images of parallax image numbers −4 to 2 are viewed in the screen on the right side at the viewing zone optimization distance L (FIG. 7(d)), and parallax images of parallax image numbers −2 to 4 are viewed in the screen on the left side (FIG. 7(e)). In this way, the set of viewed parallax images changes according to the viewing location and they are incident on both eyes. As a result, the change of appearance shown in FIG. 1(b) to FIG. 1(c) can be realized continuously.

In the II scheme, the parallax image number certainly changes over in the screen in this way when the viewer views at a finite viewing distance. Therefore, a luminance change caused by that a pixel portion or a pixel boundary portion is seen via an optical opening is not allowed. Furthermore, it is necessary to show changeover of parallax images continuously.

Therefore, causing mixture presence of parallax information (making it possible to view a plurality of pieces of parallax information from a single location), i.e., crosstalk is caused positively. When changeover occurs in parallax image numbers belonging to the same pixel group (for example, G_0), the crosstalk causes the ratio between two adjacent pieces of parallax information to change continuously according to a variation of the location viewed through an optical opening and brings about an effect like linear interpolation in the image processing.

Because of presence of the crosstalk, replacement of the parallax image number in the case where the viewing distance moves forward or backward is also performed continuously. When the viewing distance is extremely short or long, replacement of the pixel group is also performed continuously. If the viewing location gets near the display face, then the change of the inclination of a line drawn from the viewing location toward each optical opening becomes large and consequently the frequency of replacement of changeover of the parallax image number increases (FIG. 7(h)).

If the viewing location goes away from the display face, then conversely the frequency of parallax image number changeover decreases (FIG. 7(i)). In other words, because of presence of crosstalk, the viewer can view a three-dimensional image having a higher perspective degree provided that the viewer views at a distance shorter than the viewing zone optimization distance L from the display face (FIG. 7(h)). If the viewer views at a distance longer than the viewing zone optimization distance L, the viewer can view a three-dimensional image having a lower perspective degree continuously without a sense of incongruity (FIG. 7(i)). In other words, the change of the perspective projection degree caused by a variation of the viewing distance can be reproduced, and this is nothing but that light rays from a real object can be reproduced in the II scheme. As a result, it can be said that a shaded zone in FIG. 7(b) is a viewing zone where the three-dimensional image is changed over continuously.

If the viewer views beyond the viewing zone boundary in the II scheme, then a pixel viewed over every optical opening is associated with a pixel group (G_−1) (FIG. 7(f)) or associated with a pixel group (G_1) (FIG. 7(g)). In other words, a three-dimensional image displayed with a shift of one optical opening is viewed. Since distortion of the image is equivalent to that in the multiview scheme, its description will be omitted.

Figure 8:
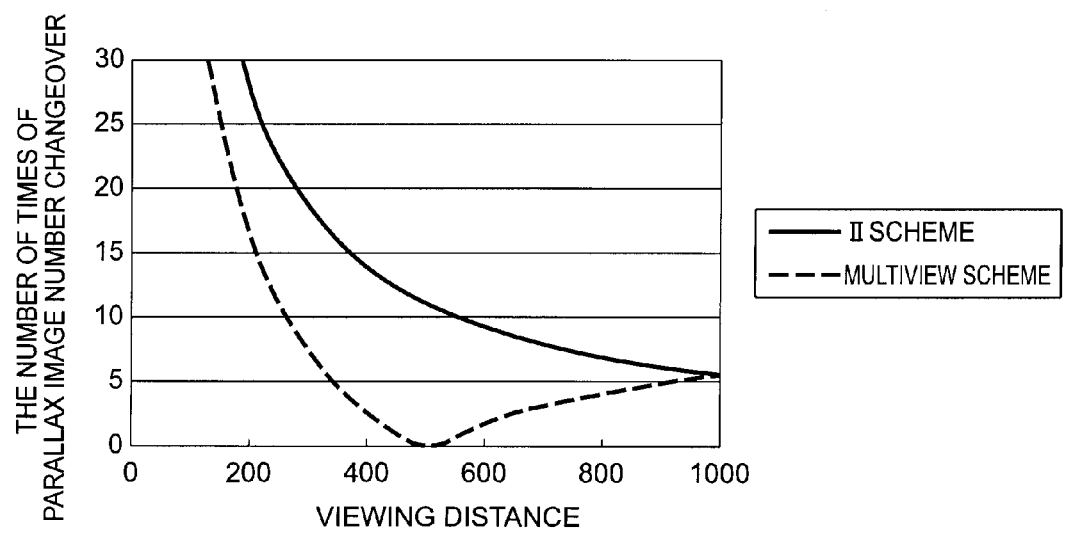
FIG. 8 is a diagram showing a switching frequency of a viewing distance and a parallax image number in the multiview scheme and the II scheme.

The relation of changeover frequency of the viewing distance and the parallax image number in the multiview scheme and the II scheme will now be described with reference to FIG. 8. It is supposed in the present specification that crosstalk is present in both the multiview scheme and the II scheme. In the multiview scheme, parallax images having the same parallax image number are included in the screen when viewed from one point at the viewing zone optimization distance L. In the II scheme, the parallax image number is changed over in the screen when viewed from the viewing zone optimization distance L.

Figure 9:
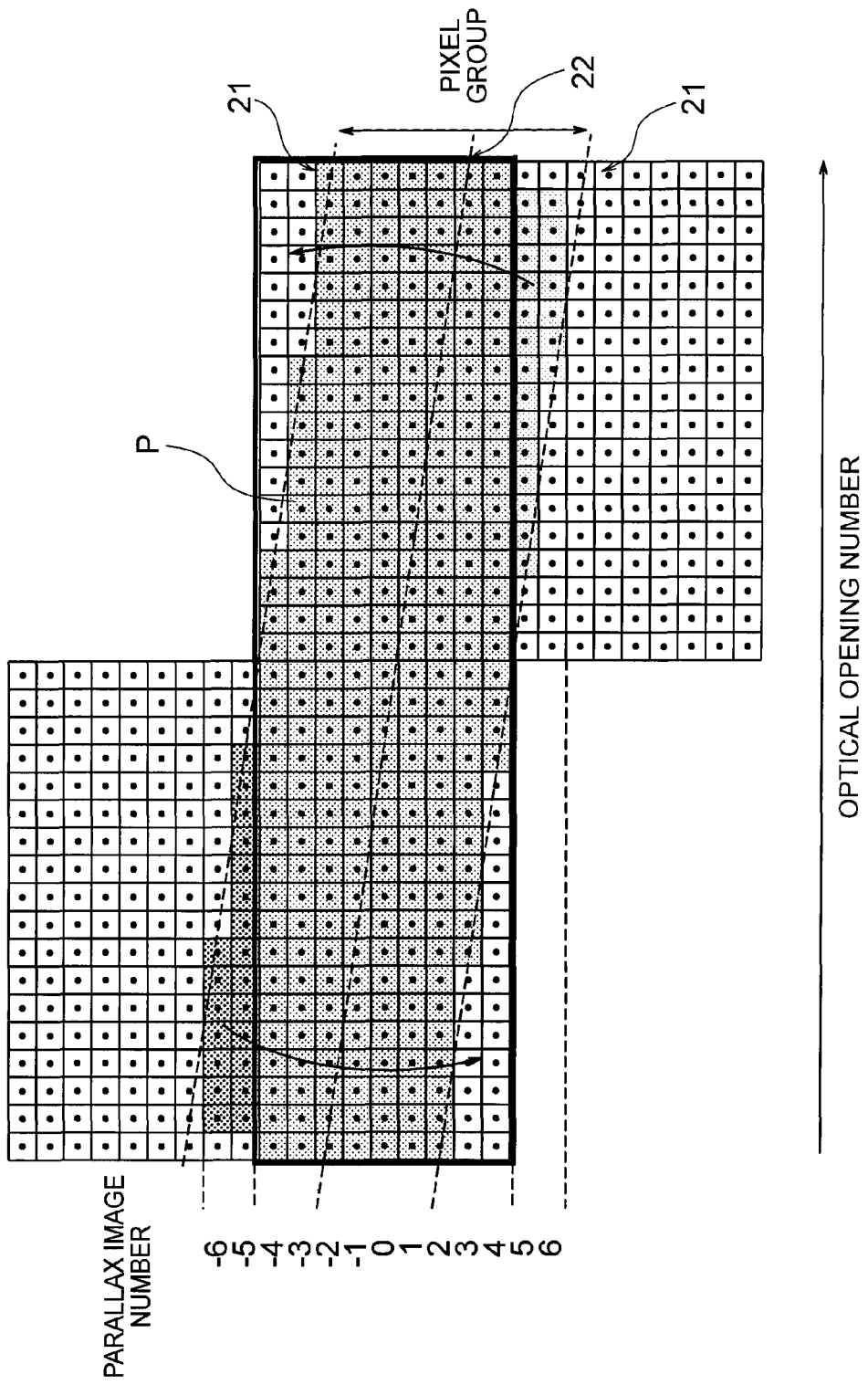
FIG. 9 is a diagram showing a data space which represents a parallax image and a viewing zone boundary in the II scheme.
Figure 10:
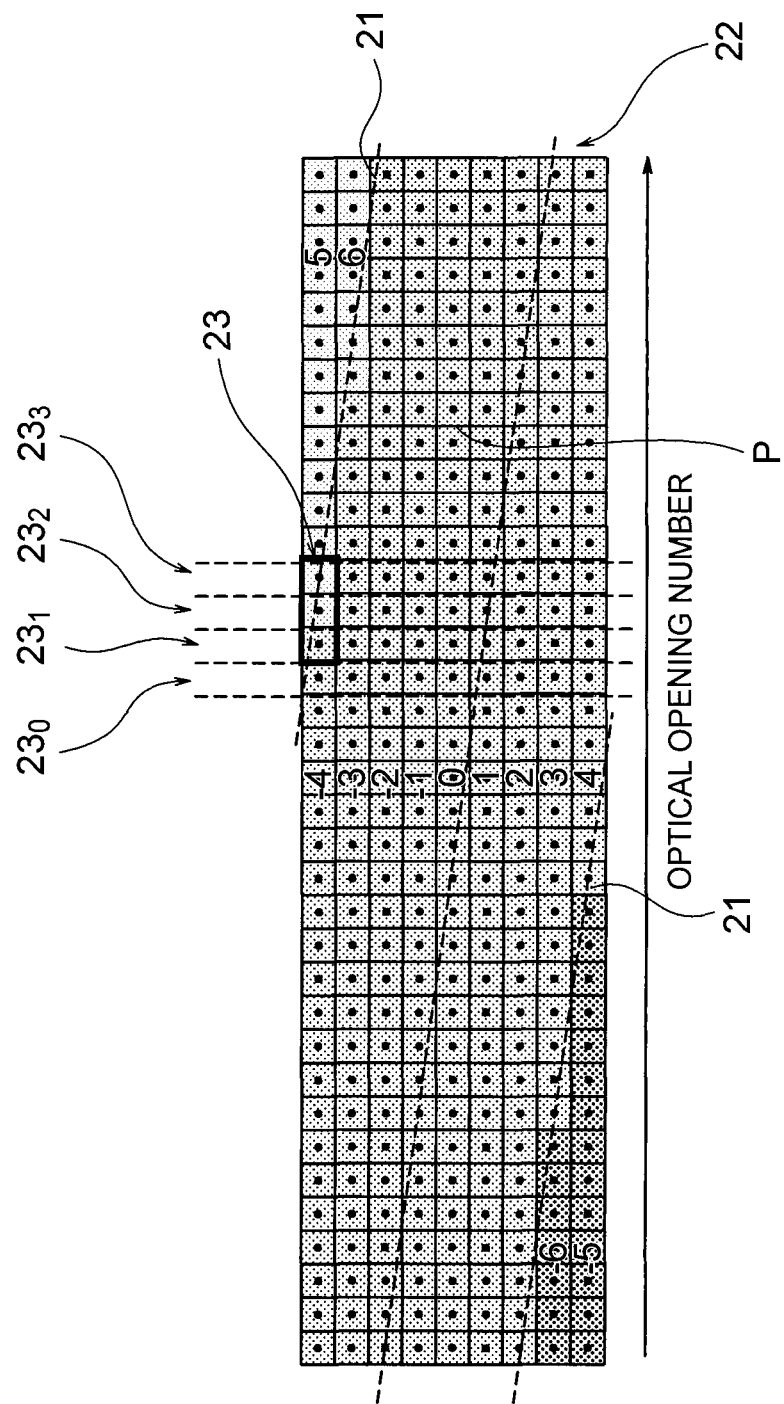
FIG. 10 is a diagram showing a data space which represents a parallax image and a viewing zone boundary in the II scheme.

FIG. 9 and FIG. 10 are concept diagrams of data space which represent parallax images and a viewing zone boundary in the II scheme given by Expression (4). The data space shown in FIG. 9 is nearly equivalent to that typically known as light ray space (EPI). The abscissa axis in FIG. 9 indicates an optical opening number (a number of pixel group), and the ordinate axis indicates a parallax image number. Here, a pixel group associated with a second leftmost optical opening is disposed on the left side (in the upward direction in FIG. 9) to the optical opening. A pixel group associated with the leftmost optical opening lacks pixels on the left side. This means that pixels located outside the optical opening do not physically exist. A pixel group associated with an optical opening located nearly in the center is disposed right behind the optical opening. As the optical opening is located on the further right side, the pixel group is disposed on the right side (in the downward direction in FIG. 9) to the optical opening. Each square (having a dot in the center) P represents parallax information of one pixel of each parallax image. As for pixels having the same relative location with respect to the optical opening, parallax information P resulting from the same parallax image is displayed. The parallax information P displayed on one pixel is shown as data space with respect to only certain one value in a coordinate (y coordinate) in a vertical direction of each parallax image. In other words, all pixels shown in FIG. 9 represent parallax images at the same y coordinate (longitudinal coordinate). In the real space, pixel groups are disposed to be adjacent in the horizontal direction of the screen. In the data space, pixels coupled by an arrow in FIG. 9 mean parallax information P displayed in a single pixel. In the case of the II scheme represented by Expression (4), a zone taking a shape of a parallelogram surrounded by two dashed lines 21 which represent viewing zone boundaries is used and the number of parallax images becomes greater than the number of parallaxes. By the way, the dashed line 21 of the viewing zone boundary (although two, i.e., upper and lower dashed lines are shown in FIG. 9, as a matter of fact there is one line in the same way as the relation between pixels indicated by an arrow) is found by using the following expression.

On the right side of the screen center:

$$Ncp = -(B-A) \times (XP - 0.5) + Nc(0)$$

On the left side of the screen center:

$$Ncn = -(B-A) \times (XP + 0.5) + Nc(0) \quad (7)$$

Here, Ncp and Ncn are parallax image numbers (real number values), A is the pitch of optical openings, B is the average width of a pixel group associated with each optical opening, and XP is an optical opening number. If $Nc(0) = B/2$, then Expression (7) represents the upper dashed line 21 in FIG. 9. If $Nc(0) = -B/2$, then Expression (7) represents the lower dashed line 21 in FIG. 9. However, Expression (7) represents the case where the number of optical openings is even. XP is a numerical value with the center screen taken as the origin, and XP assumes a positive number on the right side of the center screen and assumes a negative number on the left side of the center screen. It should be noted that the optical opening number skips between the left side and the right side of the origin provided that the number of optical openings is even. Because in this case a pixel group associated with the screen center does not exist, i.e., the origin is located at a boundary between two center pixel groups shown in FIG. 9. For example, if the number of optical openings is four, the optical openings are provided with optical opening numbers −2, −1, 1 and 2 in order from the left. Also in the case where the number of optical openings is odd, a similar concept can be used. In this case, however, a pixel group associated with the screen center exists and consequently an optical opening number associated with the origin exists. For example, if the number of optical openings is three, the optical openings are provided with optical opening numbers −1, 0 and 1 in order from the left. The calculation expression becomes as represented by Expression (8).

On the right side of the screen center:

$$Ncp=-(B-A)\times XP+Nc(0)$$

On the left side of the screen center:

$$Ncn=-(B-A)\times XP+Nc(0) \tag{8}$$

Here, Ncp and Ncn are parallax image numbers (real number values), and XP is an optical opening number. If Nc (0)=B/2, then Expression (8) represents the upper dashed line 21 in FIG. 9. If Nc (0)=−B/2, then Expression (8) represents the lower dashed line 21 in FIG. 9.

A pixel group of n pixels and a pixel group of (n+1) pixels associated with each optical opening number in the zone surrounded by the dashed lines 21 are associated with the n-pixel group and (n+1) pixel group in the foregoing description, respectively.

Monocular viewing performed by a viewer from a certain viewpoint is nearly equivalent to viewing a group of pixels passed by a straight line (for example, the dashed line 22) which is defined in inclination and intercept of longitudinal axis according to the viewing location in the data space shown in FIG. 9. When the distance (viewing distance) to the screen is short, the inclination becomes great and a shift from the front of the screen to the right causes a downward shift of the dashed line 22. In other words, the dashed line 22 can also be represented by utilizing Expression (7) or Expression (8), the value of B changes according to Expression (7) or Expression (8), and Nc(0) is determined by a shift from the front of the screen to the left or right according to the viewing location of a viewer. If a location associated with the parallax image number 0 is determined to be the front of the screen and a location associated with the dashed line 21 is determined to be a viewing zone boundary, then Nc(0) at this time can be found on the basis of a ratio of the distance between the front of the screen and the viewing zone boundary to the distance between the front of the screen and the viewing location. As a matter of fact, however, viewing is performed with parallax information displayed on adjacent pixels mixed beyond optical openings (with crosstalk present). Therefore, parallax information P on pixels which are adjacent to and located below or above a pixel passed by a straight line is mixed and seen. Rewriting the concept diagram shown in FIG. 9 by taking the spacing between optical openings as a reference, i.e., rewriting the concept diagram to make the pitch of longitudinal pixel groups coincide with the spacing between optical openings yields representation shown in FIG. 10. In order to avoid confusion, pixel groups partitioned with the spacing between optical openings at this time are referred to as optical opening reference pixel groups, and distinguished from the above-described pixel groups. In the multiview scheme, pixel groups coincide with optical opening reference pixel groups. The II scheme can be said to be the case where they do not coincide with each other.

Heretofore, the changeover of the viewing location and the parallax image number in the multiview scheme and the II scheme has been described. At the viewing zone boundary in the II scheme, however, pseudo-stereoscopy is seen or a double image caused by simultaneously viewing a component of pseudo-stereoscopy due to crosstalk is seen. In addition, a stripe-shaped breakup image is generated. Hereafter, this phenomenon will be described.

(Description of Stripe-Shaped Breakup Image Characteristic to II)

It has already been described that crosstalk is utilized actively in the II scheme. A stripe-shaped breakup image viewed at the viewing zone boundary and an image with the stripe-shaped disturbance removed which should be given originally will now be described with due regard to crosstalk with reference to FIG. 5, FIGS. 6(*a*) and 6(*b*), FIG. 9 and FIG. 10. In the configuration shown in FIG. 5 with the viewing zone optimization not applied, the ratio at which a parallax image having a parallax image number 4 is seen gradually decreases whereas the ratio at which a parallax image having a parallax image number −4 is seen gradually increases as the optical opening shifts to the right, when monocular viewing from a certain viewing location in the vicinity of the viewing zone boundary. Densities (a ratio between a first image and a second image) of a first image (for example, the parallax information having the parallax image number 4) and a second image (for example, the parallax information having the parallax image number −4, overlapped multiple image component) of the double image change over continuously.

In the configuration subjected to the viewing zone optimization processing shown in FIGS. 6(*a*) and 6(*b*), the pixel group 15$_2$ having (n+1) pixels in the center is provided and consequently parallax information of a parallax image number −4 is changed over to parallax information of a parallax image number 5. As a result, the density of the first image increases discontinuously between an image viewed over an optical opening 20$_1$ and an image viewed over an optical opening 20$_2$. This can be appreciated by paying attention to a pixel passed by the dashed line 21 which indicates the viewing zone boundary in FIG. 10. For example, as for a pixel passed by the dashed line 21 in an optical opening reference pixel group 23$_1$ in a zone 23 surrounded by a thick line in FIG. 10, i.e., parallax information viewed monocularly from the viewing zone boundary, originally parallax information of the parallax image number −4 should be seen according to a distance from a bottom side of a rectangle which represents parallax information of a pixel crossed by the dashed line 21 representing the viewing zone boundary to the dashed line 21 and parallax information having the parallax image number 5 in a pixel group 23$_0$ (a pixel group shown in FIG. 9 having the same optical opening number as the optical opening reference pixel group 23$_0$) should be seen by a ratio corresponding to a distance from a top side of a rectangle which represents a pixel crossed by the dashed line 21 to the dashed line 21. In the same way, as for optical opening reference pixel groups 23$_2$ and 23$_3$ as well, it is desirable that the parallax image numbers −4 and 5 are seen according to a ratio depending upon distances from the dashed line to the bottom side and the top side of the rectangle. In the viewing zone optimization processing, however, the parallax image number −4 is displayed in the optical opening reference pixel group $23_1$ and the parallax image number 5 is displayed in the optical opening reference pixel groups $23_2$ and $23_3$. Therefore, a discontinuous density change is caused by a difference from the original appearance. Since an intermittent density change is generated in a location where the pixel group $15_2$ having (n+1) pixels is formed, the discontinuous density change occurs in the screen at constant intervals, resulting in strong unnatural impression. In the one-dimensional II scheme, the density change is generated as a vertical line. In the two-dimensional II scheme, the density change is generated in a lattice form.

In JP-A-2009-239665 (KOKAI), outermost parallax information included in the pixel group $15_2$ having (n+1) pixels is mixed to mitigate the discontinuous change, for example, parallax information of the parallax image number −4 and the parallax image number 5 shaded in FIG. 6(a) is mixed to mitigate the discontinuous change. If the mitigation brought about by only this processing is insufficient, mixing is performed further over a plurality of pixel groups adjacent to pixel groups each having (n+1) pixels to attempt to mitigate discontinuous changes which cause a breakup image. Considering by replacing this with the light ray space shown in FIG. 10, it is considered to be equivalent to interpolation using a typical interpolation method such as the bilinear method or the bi-cubic method between parallax information pieces which are arranged in the optical opening number direction around a pixel included in the optical opening reference pixel group $23_2$ and included in the zone 23 surrounded by the thick line. Incidentally, other parallax information used in the interpolation is not necessarily included in the optical opening reference pixel group $23_2$ and the zone 23. Owing to this as well, a discontinuous change in density of the overlapped multiple image can be mitigated to some degree. Since the above-described original appearance is not taken into consideration, however, the discontinuous change cannot be mitigated completely. In addition, if the range of interpolation is widened to obtain more intense mitigation, other parallax information is mixed into even parallax information utilized originally in the viewing zone. For example, in parallax information having the parallax image number −4 in the optical opening reference pixel group $23_1$, parallax information having the parallax image number 5 in the optical opening reference pixel group $23_2$, which has no relation to the parallax information having the parallax image number −4 in the optical opening reference pixel group 23, is mixed. This results in a possibility that new unnaturalness (sense of incongruity) will be yielded.

First Embodiment

An image processing method used in a three-dimensional image display apparatus according to a first embodiment will now be described. In the present embodiment, image processing is performed to suppress breakup images viewed at the viewing zone boundary in the II scheme and implement the reduction of the sense of incongruity. This image processing will now be described with reference to FIG. 6(b), FIG. 10, FIG. 11(a) and FIG. 11(b). As described above, a parallax image having the parallax image number 5 is displayed on a pixel which has displayed a parallax image having the parallax image number −4 until then, by providing pixel groups each having (n+1) pixels according to the viewing optimization processing. Since the density change of the overlapped multiple image between adjacent optical openings is discontinuous, it is perceived as a stripe-shaped breakup image. For example, in three first pixels in the thick line portion 23 shown in FIG. 10, therefore, parallax information having the parallax image number 4 in the optical opening reference pixel group $23_0$ is mixed into parallax information having the parallax image number −4 in the optical opening reference pixel group $23_1$. In this way, parallax information seen via an optical opening associated with the optical opening reference pixel group $23_0$ when viewing monocularly from a viewing zone boundary is brought close to the original appearance. By the way, it is originally desirable to mix the parallax image number 5 in the pixel group $23_0$ (a pixel group in FIG. 9 having the same optical opening number as that of the optical opening reference pixel group $23_0$). Here, however, the parallax image number 4 is used instead. Furthermore, a parallax image seen via an optical opening associated with the optical opening reference pixel group $23_1$ when the viewer views monocularly from a viewing zone boundary is brought close to the original appearance by mixing parallax information having a parallax image number −3 in the optical opening reference pixel group $23_2$ into parallax information having a parallax image number 5 in the optical opening reference pixel group $23_2$. By the way, it is originally desirable to mix the parallax image number −4 in the pixel group $23_2$ (a pixel group in FIG. 9 having the same optical opening number as that of the optical opening reference pixel group $23_2$). Here, however, the parallax image number −3 is used instead. By doing so, a component of parallax information resulting from the three-dimensional image to be seen and a component of parallax information resulting from the overlapped multiple image are contained in an image seen by an optical opening associated with a pixel group $23_1$ (a pixel group in FIG. 9 having the same optical opening number as that of the optical opening reference pixel group $23_1$) and associated with a pixel group $23_2$ (a pixel group in FIG. 9 having the same optical opening number as that of the optical opening reference pixel group $23_2$). In this example, a parallax information component of the parallax image number 4 is contained in the parallax image number −4 and a parallax information component of the parallax image number −3 is contained in the parallax image number 5. As a result, a discontinuous density change can be suppressed. In the present embodiment, appearance to be originally seen at a viewing zone boundary is nearly reproduced by image processing. Therefore, an unnatural density change does not appear. This processing is performed on all pixels passed by the dashed line 21 at the viewing zone boundary. In FIG. 6(b), this means that parallax information on a pixel (a first pixel) which is passed by the dashed line 21 indicating the viewing zone boundary and which is included in pixels located on both sides of a boundary between pixel groups is mixed with parallax information on a pixel (a second pixel) which is adjacent to the first pixel and which is included in pixels forming an adjacent pixel group. According to a most suitable method for determining the mixture ratio at this time, parallax information of the first pixel passed by the dashed line 21 which represents the viewing zone boundary shown in FIG. 10 and parallax information of the second pixel adjacent to the first pixel via a boundary line 24 shown in FIG. 11(a) which is a physical boundary line between pixel groups are mixed according to a distance (for example, denoted by $P_1$ in FIG. 11(b)) from a top side of a rectangle which means parallax information of the first pixel passed by the dashed line 21 at the viewing zone boundary to the dashed line 21 and a distance (for example, denoted by $P_2$ in FIG. 11(b)) from a bottom side of the rectangle which means parallax information of the first pixel passed by the dashed line 21 at the viewing zone boundary to the dashed line 21. For example, if a ratio determined from lengths in FIG. 11(b) is Length of $P_1$:length of $P_2$=0.6:0.4, information obtained by mixing the parallax information of the second pixel with parallax information of the first pixel at a ratio of 0.4 is used as parallax information of the first pixel. By the way, the lengths of $P_1$ and $P_2$ are lengths on a straight line in the longitudinal direction which passes through the center of the rectangle as shown in FIG. 11(b). However, the lengths of $P_1$ and $P_2$ may be lengths on a straight line in the longitudinal direction which passes through the rectangle.

Heretofore, the case where the boundary line 21 crosses a pixel in the real space and parallax information in the data space has been described. If the boundary line 21 coincides with a pixel boundary in the real space and a parallax information boundary in the data space, however, neither the first pixel nor the second pixel is generated and the processing for mixing the second parallax information into the first parallax information is not performed (the original appearance on the viewing zone boundary can be reproduced even if the processing is not performed).

Contents represented as a pixel in the foregoing description may be interpreted as subpixel. Because a pixel can be formed of an RGB triplet and consequently the reproducible light ray directions can be increased, i.e., a three-dimensional image having a higher quality can be displayed by displaying parallax information with a subpixel pitch. Furthermore, only the horizontal direction has been described and shown in the drawings. If parallax information is also displayed in the vertical direction perpendicular to the horizontal direction (as in the two-dimensional II scheme using a microlens array), however, the method described in the present embodiment can be applied to the vertical direction as it is.

First Example

The three-dimensional image display apparatus according to the first embodiment will be described in more detail as a first example.

Figure 12:
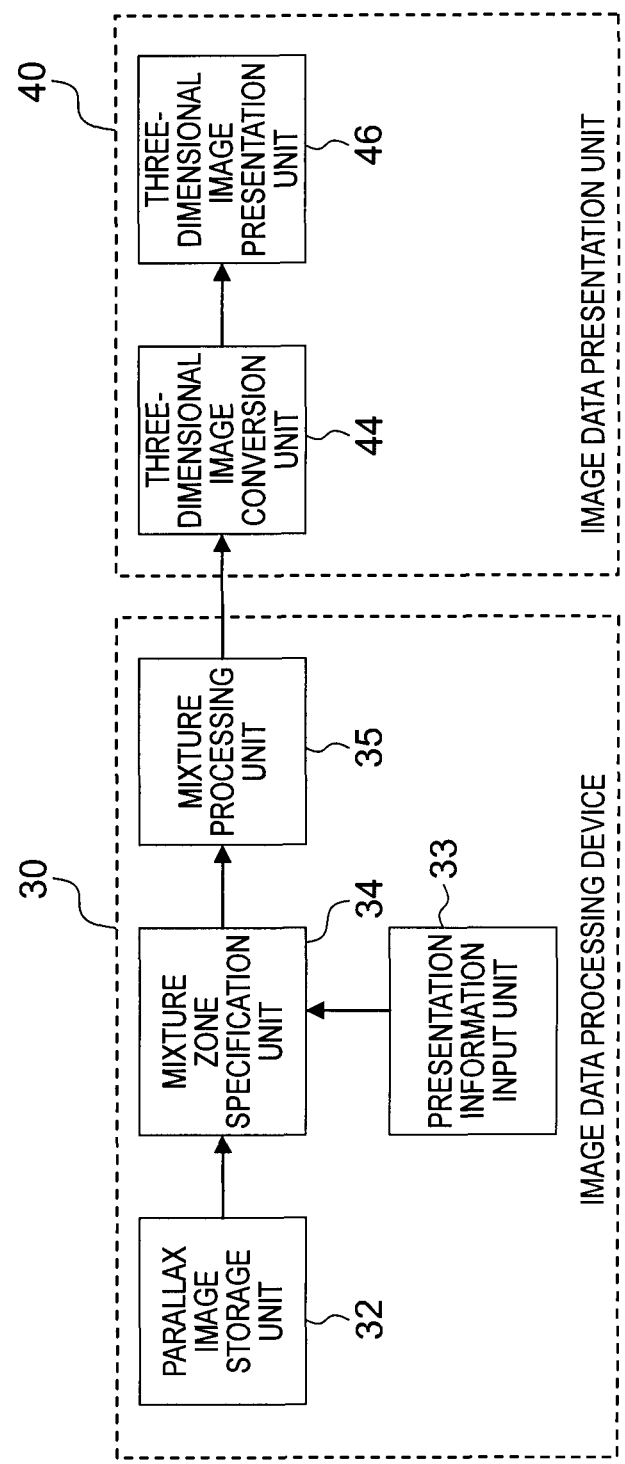
FIG. 12 is a block diagram showing a three-dimensional image display apparatus according to a first example of a first embodiment.
Figure 13:
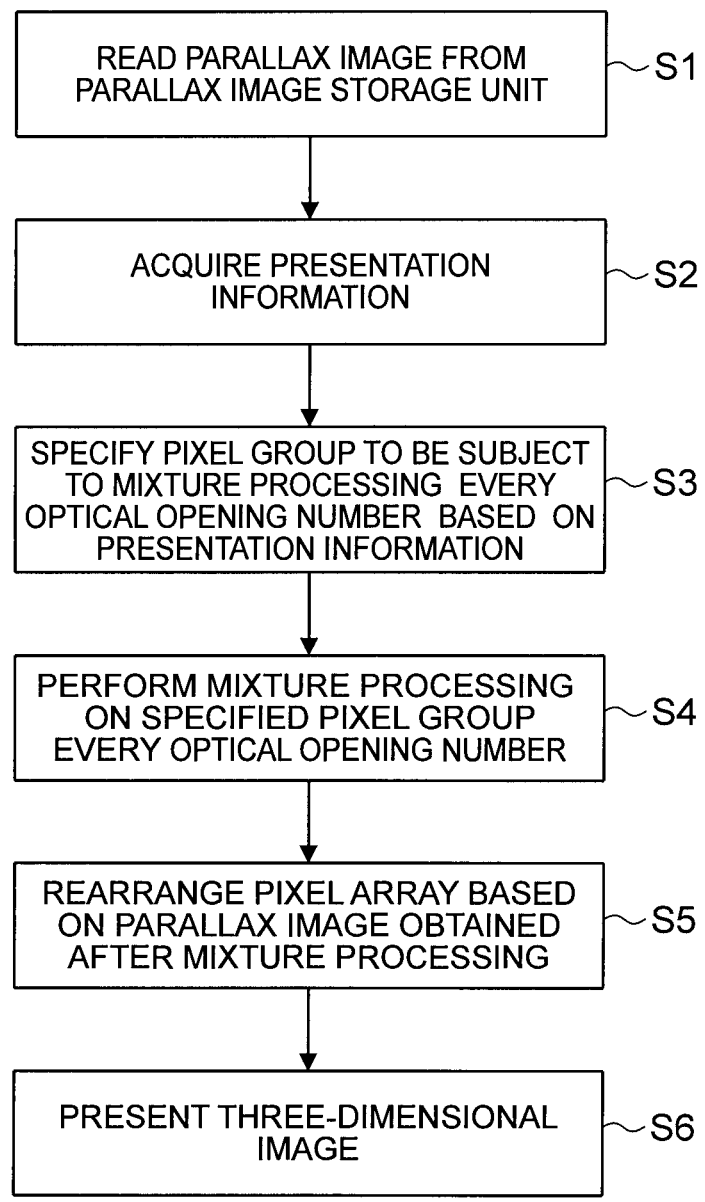
FIG. 13 is a flow chart showing an image processing procedure in the first example of the first embodiment.

A block diagram of the three-dimensional image display apparatus in the present example is shown in FIG. 12, and a flow chart showing a procedure of image processing is shown in FIG. 13. As shown in, for example, FIG. 7(b), the three-dimensional image display apparatus in the II scheme includes a plane image display device 10 and an optical plate 20. The plane image display device 10 is, for example, a liquid crystal display device, and the plane image display device 10 includes a plane image display unit formed of pixels arranged in the longitudinal direction and the lateral direction in a matrix form. The optical plate 20 includes a plurality of optical openings. The optical plate 20 is disposed to be opposed to the plane image display unit to control light rays from the pixels. As shown in FIG. 12, the three-dimensional image display apparatus in the present example further includes an image data processing device 30 and an image data presentation device 40 to process an image data.

The image data processing device (image processing device) 30 includes a parallax image storage unit 32, a presentation information input unit 33, a mixture zone specification unit 34, and a mixture processing unit 35. The image data presentation device 40 includes a three-dimensional image conversion unit 44 and a three-dimensional image presentation unit 46. The three-dimensional image presentation unit 46 includes the plane image display unit in the plane image display device 10 and the optical plate 20.

For example, an acquired or given parallax image group is stored in the parallax image storage unit 32 using RAMs. On the other hand, specifications (such as the pitch A of optical openings, the subpixel pitch Pp, the number of pixels in the plane image display unit, and an air converted focal length (gap) between the optical plate and the plane image display unit) and the viewing location of the three-dimensional image display apparatus are stored in the presentation information input unit 33. These specifications are input from the outside to presentation information input unit 33.

For every optical opening number, the mixture zone specification unit 34 specifies the first pixel passed by the dashed line 21 which indicates the viewing zone boundary in FIG. 10 and the second pixel belonging to a pixel group which is adjacent to the first pixel on the basis of information supplied from the presentation information input unit 33.

The mixture processing unit 35 mixes parallax information of the second pixel into the first pixel which is specified every optical opening number by the mixture zone specification unit 34. According to a most suitable method for determining the mixture ratio at this time, parallax information of the first pixel passed by the dashed line 21 which represents the viewing zone boundary shown in FIG. 10 and parallax information of the second pixel adjacent to the first pixel via a boundary line 24 shown in FIG. 11(a) which is a physical boundary line between pixel groups are mixed according to a distance (for example, denoted by $P_1$ in FIG. 11(b)) from a top side of a rectangle which means parallax information of the first pixel passed by the dashed line 21 at the viewing zone boundary to the dashed line 21 and a distance (for example, denoted by $P_2$ in FIG. 11(b)) from a bottom side of the rectangle which means parallax information of the first pixel passed by the dashed line 21 at the viewing zone boundary to the dashed line 21. For example, if a ratio determined from lengths in FIG. 11(b) is $$\text{Length of } P_1 : \text{length of } P_2 = 0.6:0.4,$$

information obtained by mixing the parallax information of the second pixel with parallax information of the first pixel at a ratio of 0.4 is used as parallax information of the first pixel. The image data processing device 30 performs processing described thus far. In other words, as for the processing procedure of the image data processing device 30, the image data processing device 30 first reads a parallax image from the parallax image storage unit 32 (step S1 in FIG. 13). Then, the image data processing device 30 acquires specifications (presentation information) of the three-dimensional image display apparatus stored in the presentation information input unit 33 (step S2 in FIG. 13). The mixture zone specification unit 34 specifies a group of pixels to be subjected to mixture processing every optical opening number (step S3 in FIG. 13). In other words, the mixture zone specification unit 34 specifies a pixel passed by the dashed line 21 which indicates the viewing zone boundary in FIG. 10. Then, the mixture processing unit 35 performs mixture processing on the pixel group specified every optical opening number (step S4 in FIG. 13). In other words, based on the specified result of the mixture zone specification unit 34, the mixture processing unit 35 specifies a first mixture pixel and a second mixture pixel existing in locations which differ every optical opening number with respect to the specified pixel, and performs processing for mixing the parallax image of the specified second mixture pixel into the parallax image of the specified first mixture pixel.

The parallax image group subjected to the mixture processing and output from the image data processing device 30 are rearranged in the three-dimensional image conversion unit 44 in the image data presentation unit 40 to generate an image for three-dimensional image display (step S5 in FIG. 13). The image for three-dimensional image display thus generated is displayed in the three-dimensional image presentation unit 46 (step S6 in FIG. 13). Typically, the image data processing device 30 is formed of, for example, a PC (Personal Computer). As for processing in the three-dimensional image conversion unit 44, pixel information which is components of each parallax information is rearranged every optical opening. In addition, each pixel information is typically formed of image information associated with three subpixels (for example, R (red), G (green) and B (blue)), and it is premised that three subpixels are arranged in the horizontal direction. In the three-dimensional image display apparatus according to the present proposal, however, it is necessary to give parallax by using subpixels arranged in the horizontal direction (assign different parallax images). Therefore, processing of rearranging information of subpixel units typically premised to be displayed on three subpixels arranged in the horizontal direction in, for example, the longitudinal direction is performed. It is possible to prevent lowering of the processing speed by executing the rearrangement of subpixel units in the three-dimensional image conversion unit 44.

According to the present embodiment, the first pixel to be subjected to the mixture processing every optical opening number and the second pixel retaining mixture information are specified, and the mixture processing is performed according to the location of the dashed line 21 which indicates the viewing zone boundary (=ideal pixel group boundary) as described heretofore. As a result, the stripe-shaped breakup image is suppressed. In addition, in a zone of transition from a viewing zone to the side lobe, or in a zone of opposite transition, the viewed image can shift with a natural and minimum transition width.

In the present embodiment, the mixture ratio is determined according to the distance. However, it is also conceivable to utilize the area for the mixture ratio by virtually setting a value as breadth width of a rectangle which means parallax information of a pixel. In this case, as to the inside of the rectangle which means parallax information of the pixel, an area of outside of the dashed line 21 which is the viewing zone boundary (for example, an area of a virgule portion in FIG. 11(*b*)) and an area of inside (for example, an area a cross hatched portion in FIG. 11(*b*)) should be found, and the ratio between them should be set as the ratio of mixture.

Second Embodiment

A three-dimensional image display apparatus according to a second embodiment will now be described.

In the first embodiment, it is possible to suppress the stripe-shaped breakup image viewed at the viewing zone boundary in the II scheme as described above. Near the viewing zone boundary, however, pseudo-stereoscopy and a multiple image are still generated. One method for preventing this problem is known (for example, Ri saiyou, Tetsuya Miyashita, and Tatsuo Uchida, "Novel method for removing pseudo-stereoscopy in multiview 3D display," Technical report of the Institute of video information media, Vol. 33, No. 42, PP. 37-40, October 2009 (hereafter referred to simply as document)). According to the document, a blurred image is inserted near the viewing zone boundary. As a result, the blurred image is viewed by only one eye, and sharp image in the other eye is made dominant by an effect of visual field struggle. Consequently, the overlapped multiple image can be made inconspicuous. However, the document is intended for the multiview scheme, and it cannot be applied to the II scheme.

Therefore, the second embodiment provides a three-dimensional image display apparatus in which generation of the stripe-shaped breakup image is suppressed and a multiimage (mainly a double image) generated in the II scheme is suppressed by inserting a blurred image into the vicinity of the viewing zone boundary in the II scheme.

As described above, images seen near the viewing zone boundary in the multiview scheme are parallax images associated with both ends of a pixel group. For example, the images are a parallax image having the parallax image number −4 and a parallax image having the parallax image number 4. Therefore, the images should be replaced by blurred images. In the II scheme, however, a screen seen by the viewer becomes sum of a plurality of parallax images and consequently the implementation cannot be achieved by such simple replacement. In the II scheme, pixels viewed at the viewing zone boundary are a group of pixels on the dashed line 21 which indicates the viewing zone boundary in FIG. 9 and FIG. 10, and it is necessary to insert blurred images into the group of pixels. Furthermore, since crosstalk is utilized in the II scheme as described earlier, it becomes the most suitable implementation method to mix blurred images into pixels included in an offset range which is set around the dashed line 21 representing the viewing zone boundary.

Second Example

The three-dimensional image display apparatus according to the second embodiment will now be described in more detail as a second example.

Figure 14:
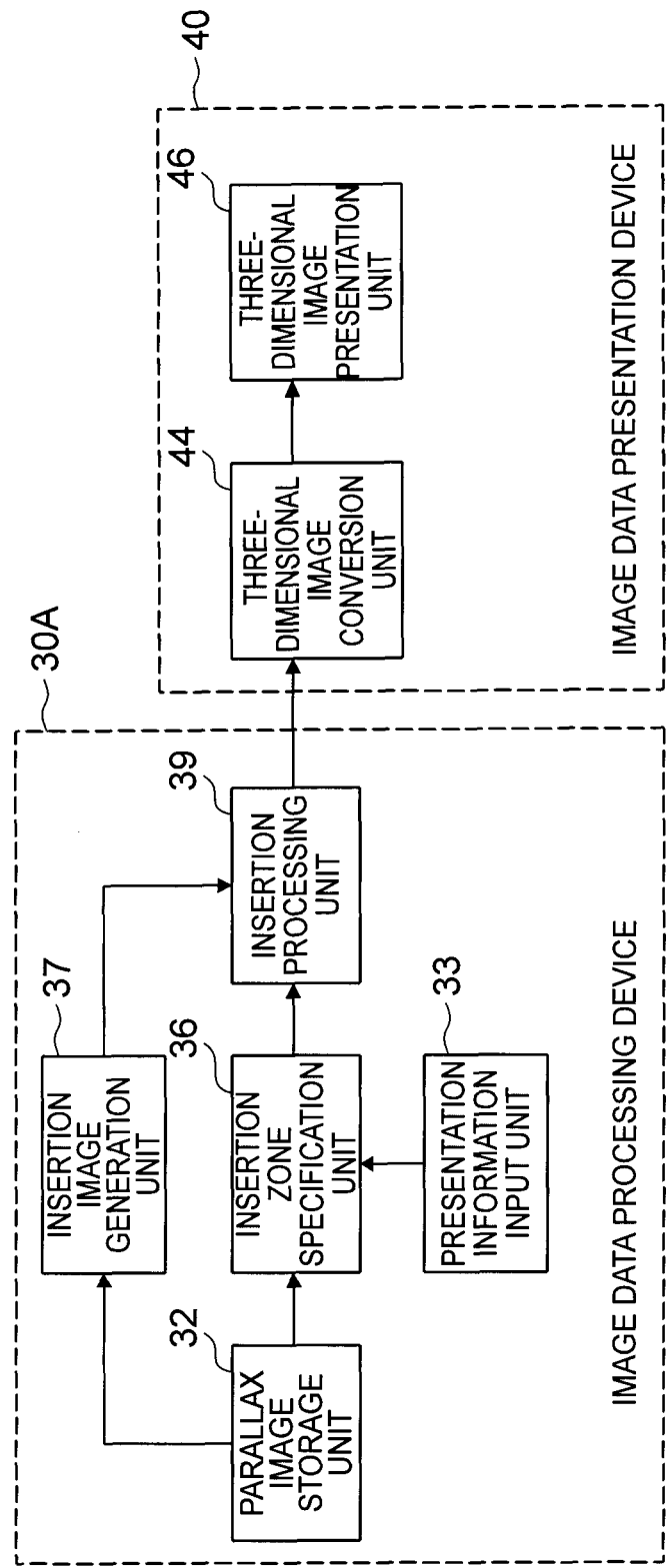
FIG. 14 is a block diagram showing a three-dimensional image display apparatus according to a second example of a second embodiment.
Figure 15:
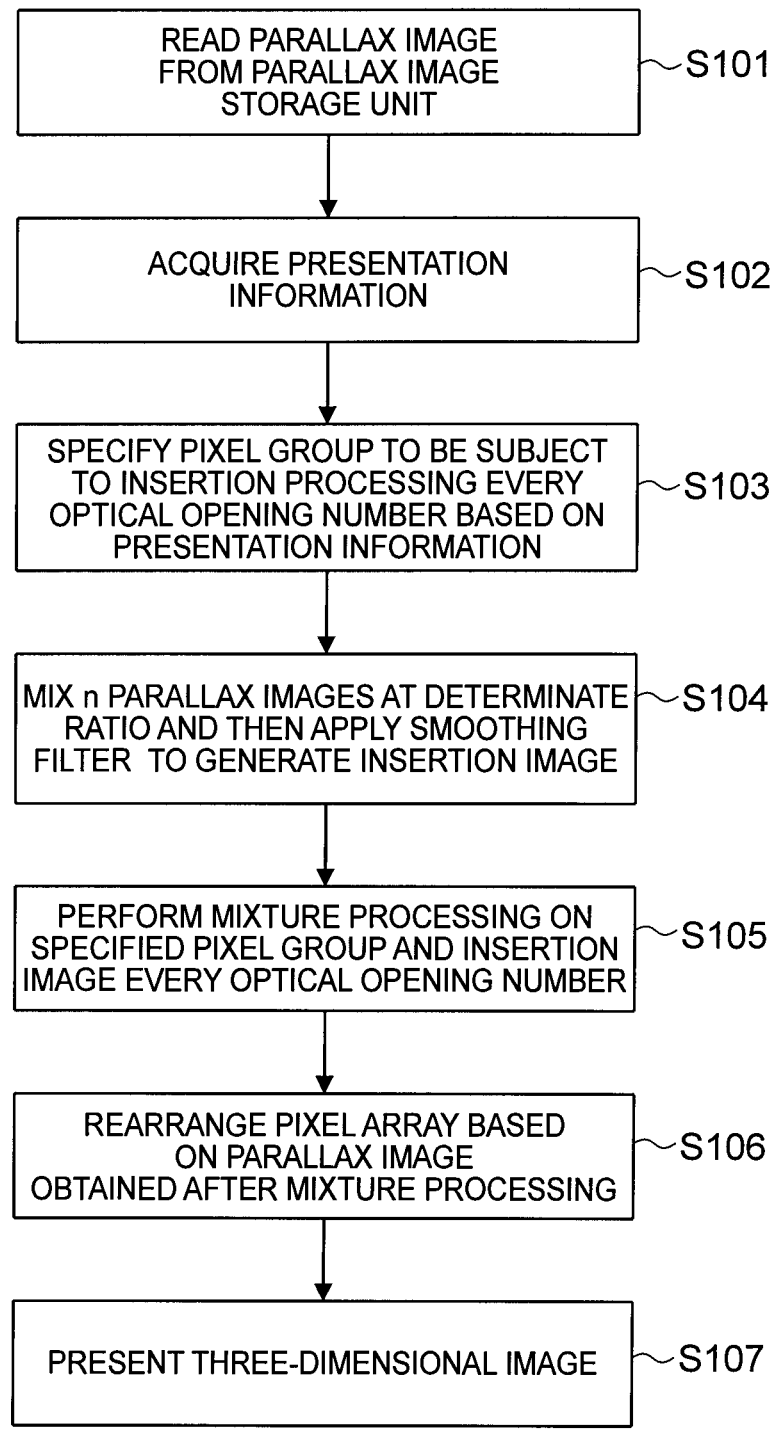
FIG. 15 is a flow chart showing an image processing procedure in the second example of the second embodiment.

A block diagram of the three-dimensional image display apparatus in the present example is shown in FIG. 14, and a flow chart showing a procedure of image processing is shown in FIG. 15. Description of the same blocks as those in the first example will be omitted.

The three-dimensional image display apparatus in the present example has a configuration obtained by replacing the image data processing device 30 with an image data processing device 30A in the three-dimensional image display apparatus in the first example shown in FIG. 12. The image data processing device 30A includes a parallax image storage unit 32, a presentation information input unit 33, an insertion zone specification unit 36, an insertion image generation unit 37, and an insertion processing unit 39.

The insertion image generation unit 37 first reads out n parallax images from the parallax image storage unit 32 (step S101 in FIG. 15). Here, n is an integer with the number of parallax images stored in the parallax image storage unit 32 being its maximum value. Then, the insertion image generation unit 37 performs weighted averaging on pixels having parallax image numbers associated with the n parallax images read out and included in pixels of optical opening reference pixel groups associated with optical opening numbers shown in FIG. 10 to have the sum total of 1.0, and determines one piece of parallax information every optical opening. FIG. 9 and FIG. 10 show parallax information having y coordinates at which there are parallax images as described above. As a matter of fact, therefore, parallax information is determined every y coordinate. Since this is performed for each optical opening number, images having a resolution equivalent to that of the parallax images are generated. Finally, a smoothing filter which is typical in image processing such as a moving average filter or a Gaussian filter is applied to the images to obtain insertion images (step S104 in FIG. 15).

The insertion zone specification unit 36 acquires specifications (presentation information) stored in the presentation information input unit 33 (step S102 in FIG. 15). The insertion zone specification unit 36 specifies parallax information contained in a range of an offset zone around the dashed line 21 which indicates the viewing zone boundary every optical opening number (a zone around the dashed line 21 having a height in the vertical direction defined by an offset value) as an insertion zone (step S103 in FIG. 15). By the way, it should be noted that the breadth width of the rectangle which indicates parallax information of the data space in FIG. 10 has no special meaning, but has meaning only in the distance from the location of the point to the top and bottom sides of the rectangle as described heretofore. Considering a segment of a line (hereafter referred to as virtual line segment) which passes through the point, which is perpendicular to the top side and the bottom side of the rectangle, and which has both ends on the top side or the bottom side, the line segment is supposed to be included in the insertion zone as long as even a part of the line segment is included in the offset zone. In this way, the insertion zone depends upon the offset value. Since the steps S102 and S103 shown in FIG. 15 and the step S104 shown in FIG. 15 are performed in different units, the procedure may be different from that shown in FIG. 15.

The insertion processing unit 39 mixes an insertion image into an insertion zone specified every optical opening number in the insertion zone specification unit 36 (step S105 in FIG. 15). As described above, the insertion image has the same resolution as that of the parallax image, and the resolution in the lateral direction becomes equal to the number of optical openings. At this time, the x coordinate of the insertion image is associated with the location of the optical opening, and a pixel at the left end of the insertion image is mixed into an insertion zone associated with an optical opening at the leftmost end. Hereafter, the pixel associated with the optical opening is defined as insertion pixel. The mixture processing is broadly divided into two patterns.

The first pattern will now be described. As for a pixel for which a virtual pixel segment of parallax information P specified as the insertion zone is completely included in the offset zone around the dashed line 21, parallax information of the pixel is replaced by parallax information of the insertion pixel.

The second pattern will now be described. As for a pixel for which a virtual pixel segment of parallax information P specified as the insertion zone is partially included, the length included in the offset zone is calculated every pixel and parallax information of an insertion image is mixed according to a ratio of its length. For example, the length of the virtual pixel segment of parallax information P is set equal to 1.0. Paying attention to parallax information of a pixel judged to be an insertion zone, it is supposed that the length contained in the offset zone around the dashed line 21 which indicates the viewing zone boundary is 0.3. In this case, new parallax information is generated by weighted averaging with the weight of the original pixel being set equal to 0.7 and the weight of the insertion pixel being set equal to 0.3. If it is desired to lighten the processing load, even parallax information belonging to the second pattern may be replaced simply by parallax information of the insertion pixel in the same way as the first pattern. In this case, a density change similar to the stripe-shaped breakup image is generated in the insertion image in principle. However, the effect of suppressing a double image resulting from overlapped multiple image remains.

According to the present example, it becomes possible to suppress generation of a stripe-shaped breakup image and a double image caused by overlapped multiple image simultaneously.

In the present embodiment, the mixture ratio is determined depending upon the length of the virtual pixel segment included in the offset zone. However, it is also conceivable to virtually set a value for the breadth width of the rectangle which means parallax information of a pixel, regarding it as an area, and utilize it in the mixture ratio. In this case, an area of a zone located in the parallax information P and outside the offset zone and an area of a zone contained in the inside of the offset zone should be found, and the ratio between them should be set as the weight of the weighted average. This is also true of first to third modifications described hereafter.

First Modification of the Second Example

In the second example, an insertion image is generated from a parallax image. However, it is also possible to insert an insertion image which is predetermined by using a method such as reading an insertion image from the outside. In the second example, an insertion image is generated every time a parallax image is read. In the first modification, however, a monochromatic image of a middle color (for example, gray) is determined to be an insertion image. In the case of a predetermined still picture or moving picture, it is possible to reduce the processing load by generating an insertion image beforehand (generating an insertion image beforehand for all frames in the case of a moving picture).

When generating an insertion image beforehand, the processing performed by the insertion image generation unit 37 should be performed in the same way. In the case of a moving picture, it is conceivable to expand n to a value corresponding to parallax images of all frames and perform similar processing, or extract a representative frame by cut detection or the like and then perform processing similar to that for a still picture on the extracted frame. Furthermore, it is also possible to tell the viewer in a form which can be appreciated easily by the viewer that the zone is a zone where a double image resulting from an overlapped multiple image or pseudo-stereoscopy is viewed and urge the viewer to change the viewing location, by causing the insertion image to contain characters or a symbol (such as an arrow) to tell that the zone is not a zone where a normal stereoscopic image is seen. Since the characters or the symbol can be placed in an arbitrary position on the insertion image, alarm presentation having a high degree of freedom becomes possible. Since in general it is not realistic for the viewer to view the screen without moving at all, the viewing distance cannot be kept constant at all times. Therefore, it is considered that the inclination of the dashed line 22 in FIG. 10 changes to some degree while the viewer is viewing. In this case, an alarm placed in a location which is near either end in FIG. 10 is presented earlier according to Expression (7) or Expression (8), and an alarm placed near the center is presented late. If the alarm can be disposed freely as described heretofore, then the presentation timing can also be controlled to some degree.

Figure 16:
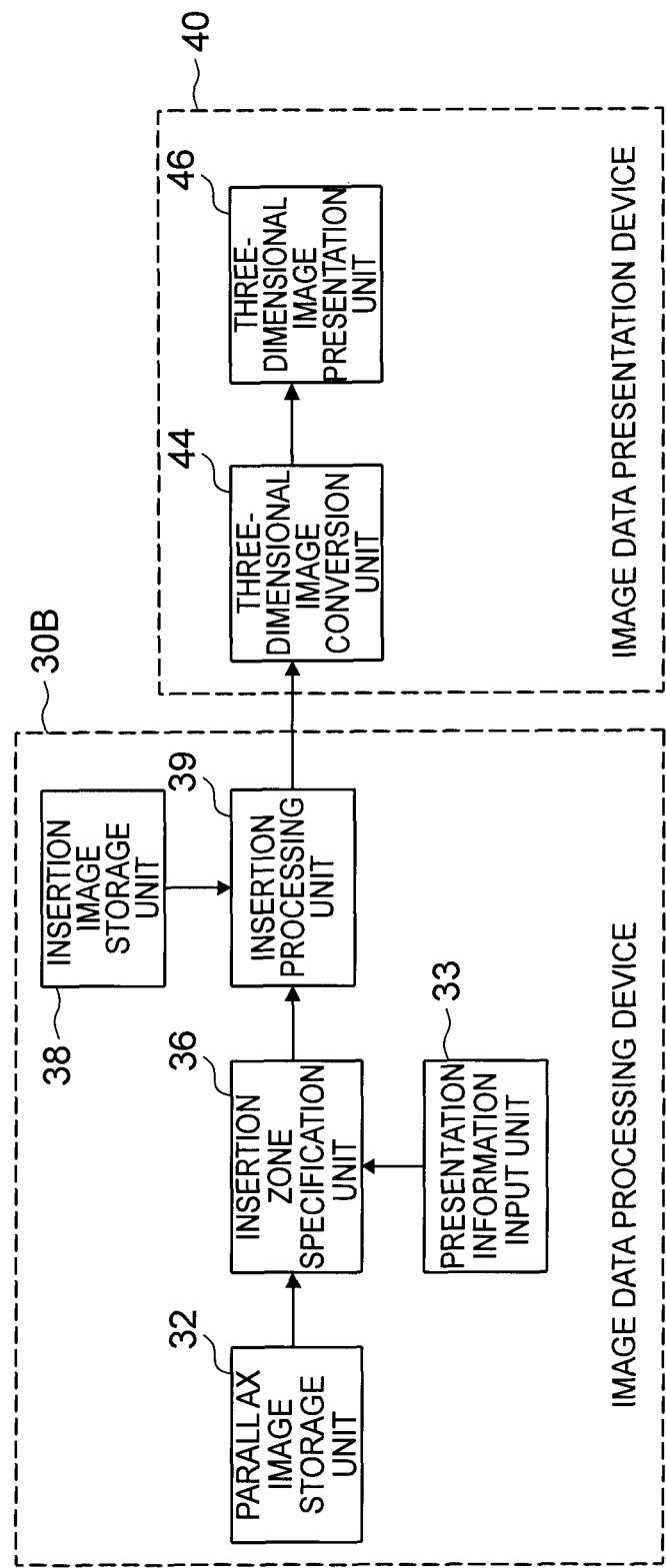
FIG. 16 is a block diagram showing a three-dimensional image display apparatus according to a first modification of a second example.
Figure 17:
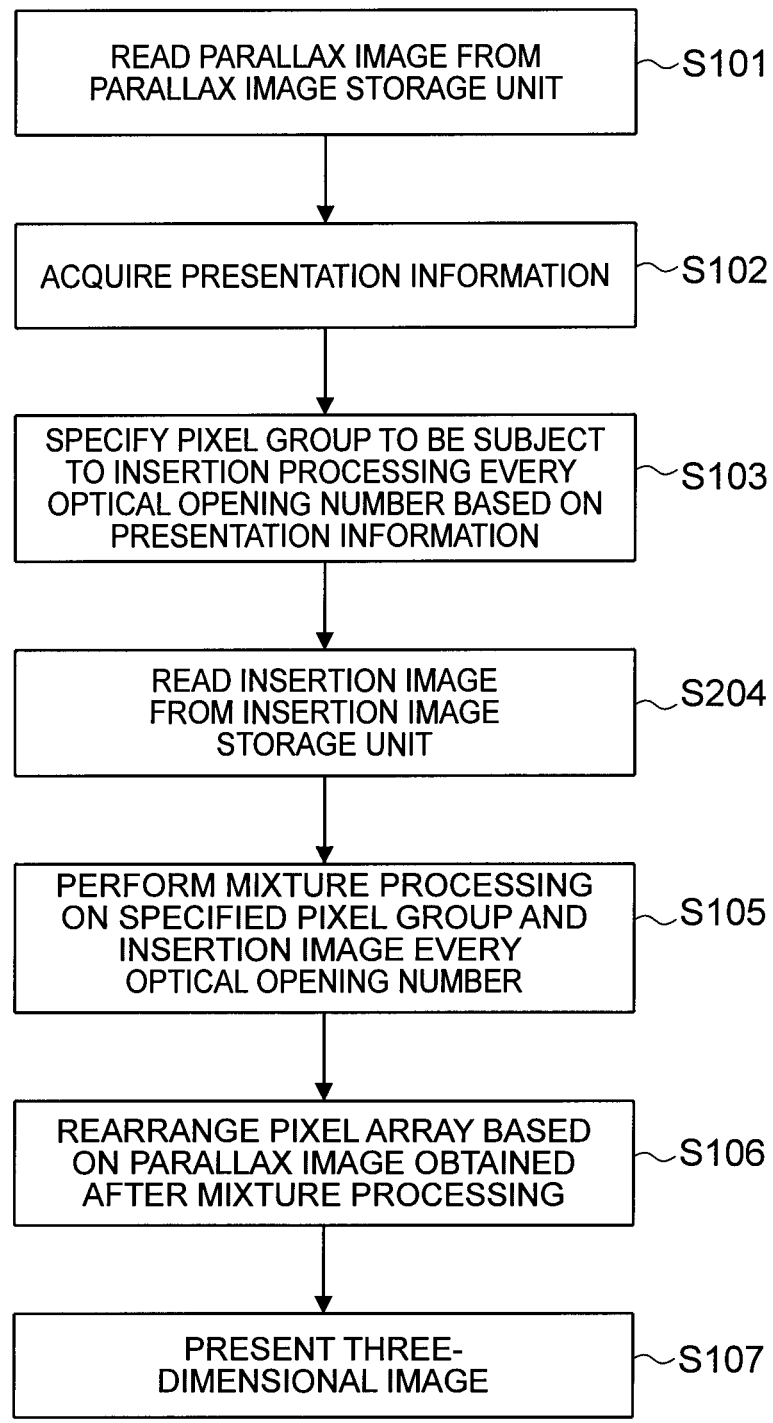
FIG. 17 is a flow chart showing an image processing procedure in the first modification of the second example.

A three-dimensional image display apparatus in the present modification is shown in FIG. 16, and its image processing procedure is shown in FIG. 17. The three-dimensional image display apparatus in the present modification has a configuration obtained by replacing the image data processing device 30A in the second example shown in FIG. 14 with an image data processing device 30B. The image data processing device 30B has a configuration obtained by removing the insertion image generation unit 37 from the image data processing device 30A in the second example and newly providing an insertion image storage unit 38 to store the insertion image. Therefore, the image processing procedure in the present modification shown in FIG. 17 has a configuration obtained by providing step S204 instead of the step S104 in the image processing procedure in the second example shown in FIG. 15.

An image generated previously according to the above-described method, an image including an alarm formed of characters or a symbol (such as an arrow) representing that the zone is not a zone where a normal stereoscopic image is seen, and a monochromatic image are stored in the insertion image storage unit 38. Here, characters or a symbol which is a typical method of the alarm has been mentioned. As a matter of course, however, there is a degree of freedom similar to that in a typical image as to the display location of the alarm and the displayed matter. It is also possible to retain the transparency and mask information (information which defines whether masked every pixel). Furthermore, it is also possible to retain images of several kinds.

The insertion processing unit 39 is basically the same as that described in the second example. However, processing for reading the insertion image from the insertion image storage unit 38 is added to its preceding stage. Furthermore, if a blend ratio such as a transparency (=1−alpha value) and mask information are defined for the insertion pixel, then the blend ratio and whether to insert may be changed over according to the information by taking a pixel as the unit. For example, if the transparency is 0.5, then parallax information of the insertion pixel is not mixed according to the ratio of the length contained in the offset zone, but parallax information of the insertion pixel may be mixed at a ratio of 50% unlike the second pattern. If the transparency of the insertion pixel is 0.0 or the insertion pixel is masked, then a configuration in which the mixture processing is skipped with respect to the insertion pixel may be adopted. Furthermore, the image to be read may be changed over according to the time or external input. In addition, the insertion image need not always have the same resolution as that of the parallax image, but the insertion image may be less in resolution than the parallax image or may be greater in resolution than the parallax image. If the resolution of the insertion image is greater than that of the parallax image, then insertion processing should be performed after making the resolution of the insertion image equal to or less than the resolution of the parallax image by thinning or scaling down pixels of the insertion image. As for the method for thinning the pixels of the insertion image and the method for scaling down the pixels of the insertion image, a method well known in image processing (for example, a method for thinning only even-numbered lines or odd-numbered lines of the image, or a scaling down method such as the bilinear method or the bi-cubic method) should be used. If the insertion image is less than the parallax image in resolution, then the insertion processing unit 39 should discontinue the insertion processing at an end of the x coordinate of the insertion image. For example, if the lateral resolution of the parallax image is 256 and the lateral resolution of the insertion image is 128, then the processing should be discontinued at the time when the insertion processing is performed up to 128.

The insertion processing may be started from a location skipped by a skip quantity "s" which is previously set or input as a part of presentation information. For example, if s is equal to 10, the lateral resolution of the parallax image is 256, the lateral resolution of the insertion image is 128, and the optical opening number begins with 0, then it is possible to refrain from performing the insertion processing as far as the location of the optical opening number=9 and perform the insertion processing from the optical opening number=10. In that case, the x coordinate of the insertion image is associated with an optical opening number which is equal to the x coordinate of the insertion image+s. In other words, supposing that the x coordinate of the left end of the insertion image and the optical opening number at the left end in FIG. 10 are 0, the insertion processing at the time when s=10 is performed from the optical opening number 10 and an insertion pixel associated with the optical opening number 10 becomes a pixel in a location of x coordinate of the insertion image=0.

According to the present modification, it becomes possible to suppress generation of a stripe-shaped breakup image and pseudo-stereoscopy or a double image caused by an overlapped multiple image simultaneously while lightening the processing load under a specific condition, as described heretofore. As an effect on a different aspect, it becomes possible to tell the viewer in a form which can be appreciated easily by the viewer that the zone is a zone where the above-described problem is viewed and urge the viewer to change the viewing location.

Second Modification of Second Example

Figure 18:
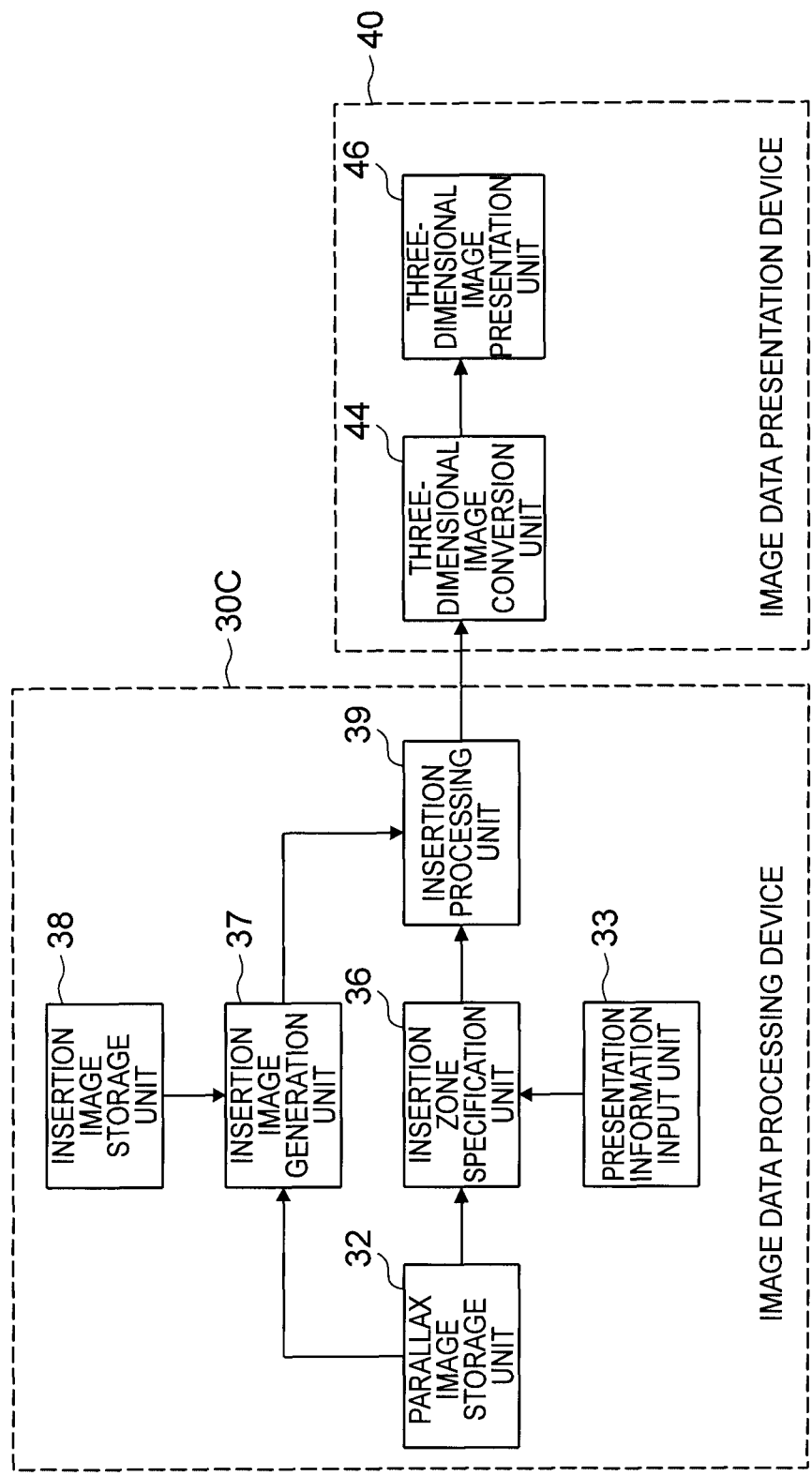
FIG. 18 is a block diagram showing a three-dimensional image display apparatus according to a second modification of the second example.
Figure 19:
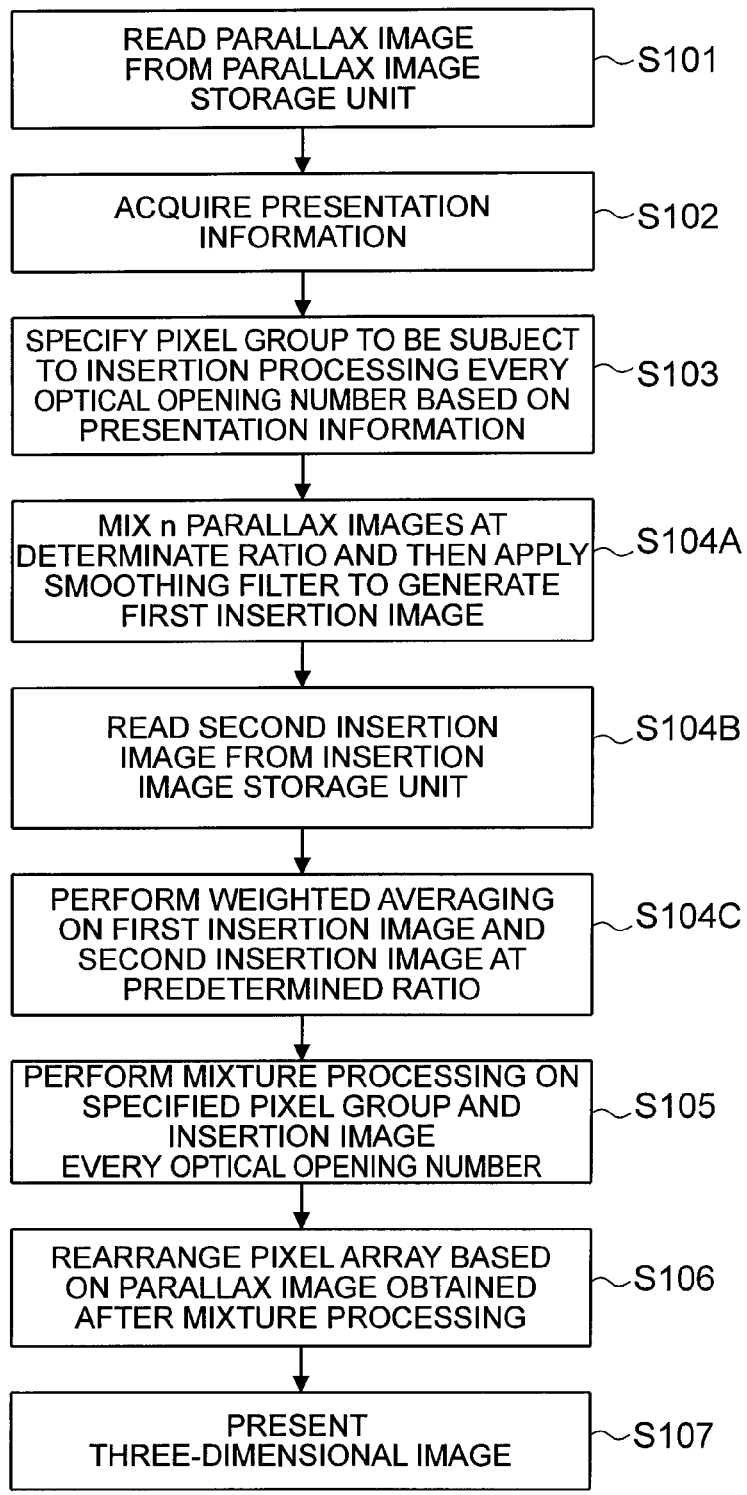
FIG. 19 is a flow chart showing an image processing procedure in the second modification of the second example.

A block diagram of a three-dimensional image display apparatus in a second modification of the second example is shown in FIG. 18, and a flow chart showing a procedure of image processing is shown in FIG. 19.

The three-dimensional image display apparatus in the present modification has a configuration obtained by replacing the image data processing device 30A in the second example shown in FIG. 14 with an image data processing device 30C. The image data processing device 30C has a configuration obtained by newly providing an insertion image storage unit 38 which stores an insertion image, in the image data processing device 30A in the second example. Therefore, the image processing procedure in the present modification shown in FIG. 19 has a configuration obtained by providing steps S104A, S104B and S104C instead of the step S104 in the image processing procedure in the second example shown in FIG. 15.

In other words, the present modification differs from the second example in processing in the insertion image generation unit 37. The insertion image generation unit 37 first generates a first insertion image according to a procedure similar to that in the second example (step S104A in FIG. 19). Then, the insertion image generation unit 37 reads an image from the insertion image storage unit 38, and determines the image to be a second insertion image (step S104B in FIG. 19). And the insertion image generation unit 37 performs weighted averaging on the first insertion image and the second insertion image at a predetermined ratio (step S104C in FIG. 19). In other words, the insertion image generation unit 37 performs weighted averaging on pixels in the first insertion image and pixels in the second insertion image respectively having associated XY coordinates, at a predetermined ratio and thereby generates a final insertion image.

By the way, the second insertion image need not always have the same resolution as that of the first insertion image, but the second insertion image may be less in resolution than the first insertion image or may be greater in resolution than the first insertion image. If the resolution of the second insertion image is greater than that of the first insertion image, then insertion processing should be performed after making the resolution of the second insertion image equal to or less than the resolution of the first insertion image by thinning or scaling down pixels of the second insertion image. As for the method for thinning the pixels of the second insertion image and the method for scaling down the pixels of the second insertion image, a method well known in image processing (for example, a method for thinning only even-numbered lines or odd-numbered lines of the image, or a scaling down method such as the bilinear method or the bi-cubic method) should be used. If the second insertion image is less than the first insertion image in resolution, then the insertion processing unit 39 should discontinue the processing at an end of the x coordinate of the second insertion image. For example, if the lateral resolution of the first insertion image is 256 and the lateral resolution of the second insertion image is 128, then the processing should be discontinued at the time when the insertion processing is performed up to 128. The insertion processing may be started from a location skipped by a skip quantity "s" which is previously set or input as a part of presentation information. For example, if s is equal to 10, the lateral resolution of the first insertion image is 256, the lateral resolution of the second insertion image is 128, and the x coordinate of the first insertion image begins with 0, then it is possible to refrain from performing the insertion processing as far as the location of the x coordinate of the first insertion image=9 and perform the insertion processing from the x coordinate of the first insertion image=10. In that case, the x coordinate of the second insertion image+s is associated with the x coordinate of the first insertion image. In other words, supposing that the x coordinate of the left end of the first insertion image and the x coordinate of the left end of the second insertion image are 0, the insertion processing at the time when s=10 is performed from the x coordinate of the first insertion image=10 and a pixel associated with it becomes a pixel in a location of x coordinate of the second insertion image=0.

According to the present modification, it becomes possible to suppress generation of a stripe-shaped breakup image and pseudo-stereoscopy or a double image caused by an overlapped multiple image simultaneously while lightening the processing load and cause a screen perceived at the viewing zone boundary to include information which does not depend on the parallax image, as described heretofore. For example, alarm information can be included. It becomes possible to reduce the zone which looks unnatural at the time of transition to the side lobe by suppressing pseudo-stereoscopy or a double image resulting from stripe-shaped disturbance or an overlapped multiple image. In addition, it becomes possible to tell the viewer in a form which can be appreciated easily by the viewer that the zone is a zone where pseudo-stereoscopy or a double image resulting from an overlapped multiple image is viewed and urge the viewer to change the viewing location quickly.

Third Modification of Second Example

In the first modification, the insertion processing is performed on the range of the offset zone around the dashed line 21 which indicates the viewing zone boundary. However, it is not always necessary to consider the insertion location by taking the dashed line 21 which indicates the viewing zone boundary as the reference. For example, if insertion processing is performed on the range of the offset zone by taking the dashed line 22 shown in FIG. 10 as the reference, it becomes possible to show the insertion image to the viewer only at a certain specific viewing distance and only in a certain specific viewpoint location. As a result, it becomes possible to tell that the viewer is viewing in a proper location only in a zone where the viewpoint of the viewer is sufficiently within the viewing zone and an overlapped multiple image is not seen.

If the insertion processing is performed in a location shifted from the dashed line 21 which indicates the viewing zone boundary to the inside of the parallelogram by a determinate quantity, it becomes possible to control timing of telling the viewer that the zone is not a zone where a normal stereoscopic image is seen, on the basis of the shift quantity. By the way, in the concept diagram shown in FIG. 9, it is considered that an upper portion and a lower portion having the dashed line 21 which indicates the viewing zone boundary as a boundary line are coupled with a shift of one optical opening number. If the dashed line 22 passes through zones respectively having parallax image numbers −5, −6, 5 and 6, therefore, it should be noted that the dashed line 22 is not one in number but the dashed lines 22 appear in respective zones passed by.

As for actual insertion processing, processing should be performed by replacing the dashed line 21 which indicates the viewing zone boundary serving as the reference of processing performed in the insertion zone specification unit 36 and the insertion processing unit 39 in the first modification and the second modification with the dashed line 22 having an inclination and a vertical location which change according to the viewing distance and the viewpoint location as described above. In other words, the insertion zone specification unit 36 should specify parallax information P which is present in the range of an offset zone around the dashed line 22 as the insertion zone every optical opening number. The insertion processing unit 39 is basically the same as that in the first modification and the second modification. However, the ratio at the time when parallax information is mixed in the second pattern should be found by taking the dashed line 22 as the reference. Since other processing is the same, its description will be omitted.

In the same way as other modifications, the insertion image has a degree of freedom similar to the typical image. In other words, the insertion image may be combined with not only characters or symbols but also CG image or a natural picture, and the insertion image may be a moving picture. In the case of a moving picture, images in different frames should be acquired from the insertion image storage unit 38 according to time. It is not always necessary that the insertion image has the same resolution as that of the parallax image. The insertion image may be less in resolution than the parallax image or may be greater in resolution than the parallax image. In that case, processing should be performed in the same way as the first modification.

According to the present modification, it becomes possible to display an arbitrary image (moving picture) such as characters or an arrow according to the viewpoint location of the viewer and it becomes possible to present various kinds of navigation information according to the current viewpoint location of the viewer, as described heretofore. If, for example, the viewer is within the viewing zone, therefore, information can be presented to make the viewer stay within the viewing zone as far as possible. When the viewer moves from the viewing zone to the side lobe (or vice versa), information can be presented to make it possible for the viewer to move naturally and swiftly.

The foregoing embodiments have been described by taking each parallax image as the reference. A method for converting to a format suitable for transmission and compression of the parallax image by putting only actually necessary parts in the parallax image together is described in JP-A-2006-098779 (KOKAI). Images obtained by this conversion are referred to as tile images, and the tile images include all parallax images required for respective examples and their modifications. Therefore, the embodiments, the examples and modifications can be implemented in the same way via the tile images as well.

As described heretofore, it becomes possible to suppress the pseudo-stereoscopy or a double image resulting from stripe-shaped breakup image or an overlapped multiple image. In addition, navigation performed by displaying an arbitrary image such as characters or an arrow depending upon a location is made possible in a zone where transition to the side lobe is made or in other zones. As a result, it is facilitated to grasp the viewing zone and it becomes possible to move from the viewing zone to the side lobe (or vice versa) naturally and swiftly.

In the first and second embodiments, countermeasures against the viewing zone boundary which can be coped with using pixel groups having n pixels and (n+1) pixels generated by performing viewing zone optimization processing and parallax information displayed on the pixel groups have been described. However, processing can also be performed by using the parallax image number described in the first embodiment as mixture processing to be performed originally. In other words, in FIG. 10, the pixel group boundary indicated by the dashed line 21 is reproduced faithfully. Pixel information which does not exist in parallax information obtained after the viewing zone optimization processing (for example, the parallax information 5 in the pixel group $23_0$ or the parallax information −4 in the pixel group $23_3$) becomes necessary. Such processing is also possible if the necessary pixel information can be extracted from the parallax image stored in the parallax image storage unit 32 in the first embodiment. It can be said that the concept of the pixel groups having n pixels and (n+1) pixels generated in the viewing zone optimization processing is dissolved and a continuous pixel group boundary is implemented by a mixture ratio of the parallax image displayed on pixels which exist only discretely.

Figure 11:
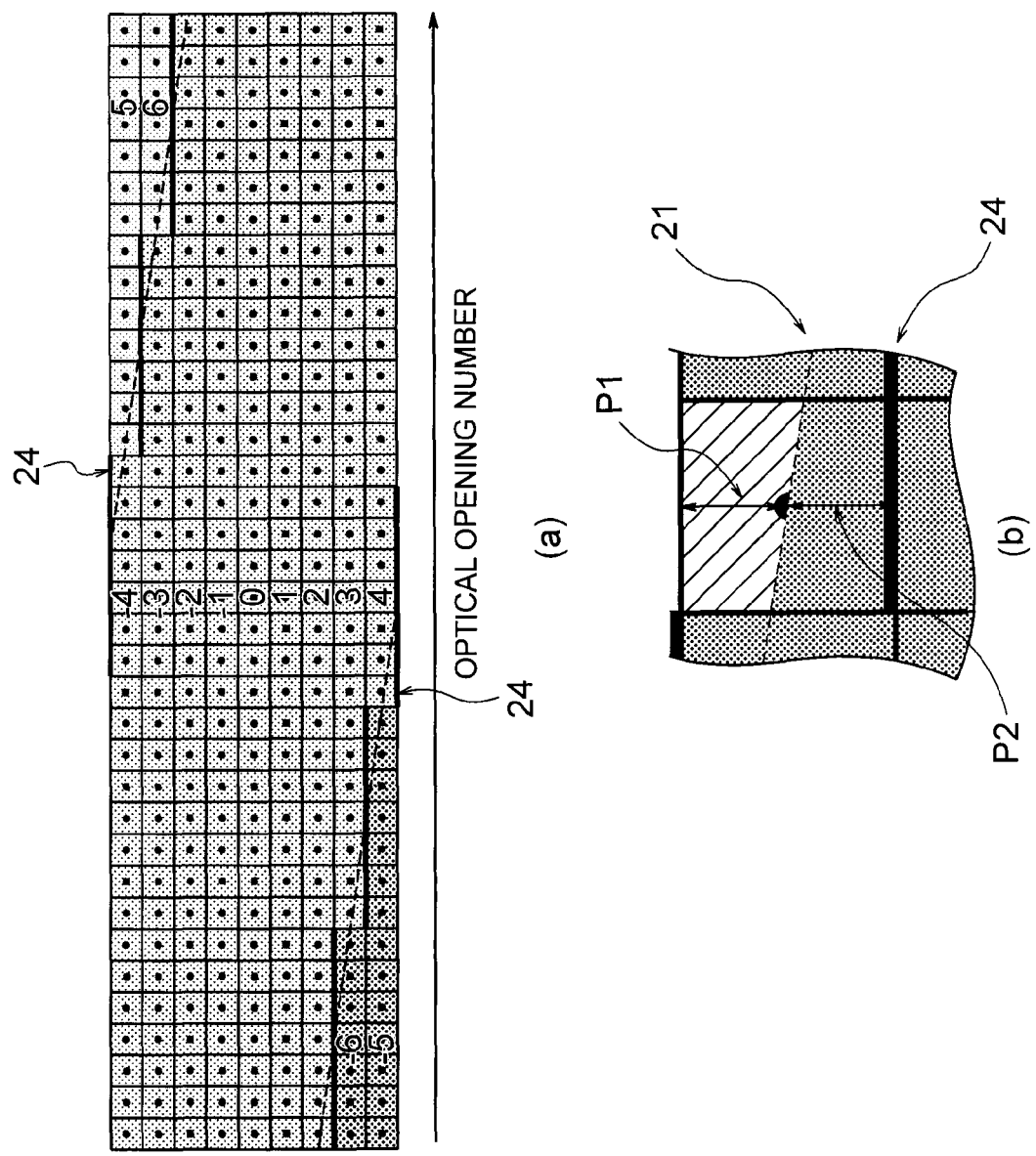
FIGS. 11(*a*) and 11(*b*) is a diagram for explaining an image processing method used in a three-dimensional image display apparatus according to a first embodiment.

In the first and second embodiments, the II scheme implemented by Expression (4) is mainly described. Data spaces in FIGS. 9, 10 and 11 are drawn with orthogonal coordinates. In the relation represented by Expression (6), however, the relative location between an optical opening and a pixel shifts every optical opening. As a result, the horizontal axis is inclined. In that case as well, processing similar to that in the first and second embodiments can be applied by drawing the dashed line 21 corresponding to the pixel group boundary which depends upon the viewing location. In other words, it can be said that the processing in the first and second embodiments is effective means for preventing stripe-shaped disturbance from being generated in all cases where the dashed line 21 corresponding to the pixel group boundary does not coincide with the physical pixel boundary without being constrained by the relative positions of the optical opening and pixel.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A three-dimensional image display apparatus comprising:
   a plane image display device comprising a plurality of pixel groups, each of the pixel groups including a plurality of pixels, the pixels arranged in a matrix form;
   an optical plate disposed so as to be opposed to the plane image display device, the optical plate being capable of controlling light arrays from the pixels by using a plurality of optical openings at the time of operation;
   an insertion image generation unit configured to read pixel values of parallax image and generate an insertion image by performing weighted averaging on pixel values of parallax image of pixels included in each pixel group;
   a specification unit configured to specify pixels included in an offset zone around a viewing zone boundary;
   an insertion processing unit configured to insert a pixel value of an associated pixel in the insertion images with respect to a pixel value of each pixel specified by the specification unit; and
   a conversion unit configured to convert the image obtained by the processing in the insertion processing unit to an image for three-dimensional image display, the image for three-dimensional image display being displayed by the plane image display device.

2. The apparatus according to claim 1, further comprising:
   a storage unit configured to store an image,
   wherein the insertion image generation unit generates a new insertion image based on the generated insertion image and the image stored in the storage unit, and
   the insertion processing unit inserts a pixel value of an associated pixel in the new insertion image with respect to a pixel value of each pixel specified by the specification unit.

3. The apparatus according to claim 1, wherein
   with respect to a pixel included in the specified pixels and contained in the offset zone completely, the insertion processing unit replaces a pixel value of the pixel by a pixel value of an associated pixel in the insertion image, and
   with respect to a pixel included in the specified pixels and contained in the offset zone partially, the insertion processing unit determines a ratio of insertion based on a ratio at which the pixel is contained in the offset zone.

4. A three-dimensional image display apparatus comprising:
   a plane image display device comprising a plurality of pixel groups, each of the pixel groups including a plurality of pixels, the pixels arranged in a matrix form;
   an optical plate disposed so as to be opposed to the plane image display device, the optical plate being capable of controlling light arrays from the pixels by using a plurality of optical openings at the time of operation;
   a specification unit configured to read pixel values of parallax image and specify pixels included in an offset zone around a viewing zone boundary;
   an insertion image storage unit configured to store insertion images to be inserted with respect to the pixels specified by the specification unit;
   an insertion processing unit configured to insert a pixel value of an associated image in the insertion images with respect to a pixel value of the pixel specified by the specification unit, the insertion images including an image having an alarm formed of characters or a symbol representing that a normal stereoscopic image is not seen, and a monochromatic image; and
   a conversion unit configured to convert an image obtained by the processing in the insertion processing unit to an image for three-dimensional image display, the image for three-dimensional image display being displayed by the plane image display device.

5. The apparatus according to claim 4, wherein
   in the image stored in the storage unit, an insertion rate is defined every pixel, and
   the insertion processing unit inserts the insertion image at the defined ratio.

6. The apparatus according to claim 4, wherein
with respect to a pixel included in the specified pixels and contained in the offset zone completely, the insertion processing unit replaces the pixel by an associated pixel in the insertion image, and
with respect to a pixel included in the specified pixels and contained in the offset zone partially, the insertion processing unit determines a ratio of insertion based on a ratio at which the pixel is contained in the offset zone.

7. An image processing device used in a three-dimensional image display apparatus including a plane image display device comprising a plurality of pixel groups, each of the pixel groups including a plurality of pixels, the pixels arranged in a matrix form, and an optical plate disposed so as to be opposed to the plane image display device, the optical plate being capable of controlling light arrays from the pixels by using a plurality of optical openings at the time of operation, the image processing device comprising:
an insertion image generation unit configured to read pixel values of parallax image and generate an insertion image by performing weighted averaging on pixel values of parallax images of pixels included in each pixel group;
a specification unit configured to specify pixels included in an offset zone around a viewing zone boundary; and
an insertion processing unit configured to insert a pixel value of an associated image in the insertion images with respect to a pixel value of the pixels specified by the specification unit.

8. An image processing device used in a three-dimensional image display apparatus including a plane image display device comprising a plurality of pixel groups, each of the pixel groups including a plurality of pixels, the pixels arranged in a matrix form, and an optical plate disposed so as to be opposed to the plane image display device, the optical plate being capable of controlling light arrays from the pixels by using a plurality of optical openings at the time of operation, the image processing device comprising:
a specification unit configured to read pixel values of parallax image and specify pixels included in an offset zone around a viewing zone boundary;
an insertion image storage unit configured to store insertion images to be inserted with respect to the pixels specified by the specification unit, the insertion images including an image having an alarm formed of characters or a symbol representing that a normal stereoscopic image is not seen, and a monochromatic image; and
an insertion processing unit configured to insert a pixel value of an associated image in the insertion images with respect to a pixel value of the pixel specified by the specification unit.

9. A three-dimensional image display apparatus comprising:
a plane image display device comprising a plurality of pixel groups, each of the pixel groups including a plurality of pixels, the pixels arranged in a matrix form;
an optical plate disposed so as to be opposed to the plane image display device, the optical plate being capable of controlling light arrays from the pixels by using a plurality of optical openings at the time of operation;
a specification unit configured to read pixel values of parallax image and specify pixels included in an offset zone around a viewing zone boundary;
an insertion image storage unit configured to store insertion images to be inserted with respect to the pixels specified by the specification unit;
an insertion image generation unit configured to generate a first insertion image by performing weighted averaging on pixels in the pixel values of parallax image of pixels included in each pixel group, read an insertion image associated with the first insertion image from the insertion image storage unit to be a second insertion image, and generate a final insertion image by performing weighted averaging on pixels in the first insertion image and pixels in the second insertion image at a predetermined ratio;
an insertion processing unit configured to insert a pixel value of an associated image in final insertion images with respect to a pixel value of the pixel specified by the specification unit; and
a conversion unit configured to convert an image obtained by processing in the insertion processing unit to an image for three-dimensional image display, the image for three-dimensional image display being displayed by the plane image display device.

10. The apparatus according to claim 9, wherein
in the image stored in the storage unit, an insertion rate is defined every pixel, and
the insertion processing unit inserts the insertion image at the predetermined ratio.

11. The apparatus according to claim 9, wherein
with respect to a pixel included in the specified pixels and contained in the offset zone completely, the insertion processing unit replaces the pixel by an associated pixel in the final insertion image, and
with respect to a pixel included in the specified pixels and contained in the offset zone partially, the insertion processing unit determines a ratio of insertion based on a ratio at which the pixel is contained in the offset zone.

12. An image processing device used in a three-dimensional image display apparatus including a plane image display device comprising a plurality of pixel groups, each of the pixel groups including a plurality of pixels, the pixels arranged in a matrix form, and an optical plate disposed so as to be opposed to the plane image display device, the optical plate being capable of controlling light arrays from the pixels by using a plurality of optical openings at the time of operation, the image processing device comprising:
a specification unit configured to read pixel values of parallax image and specify pixels included in an offset zone around a viewing zone boundary;
an insertion image storage unit configured to store insertion images to be inserted with respect to the pixels specified by the specification unit;
an insertion image generation unit configured to generate a first insertion image by performing weighted averaging on pixels in the pixel values of parallax image of pixels included in each pixel group, read an insertion image associated with the first insertion image from the insertion image storage unit to be a second insertion image, and generate a final insertion image by performing weighted averaging on pixels in the first insertion image and pixels in the second insertion image at a predetermined ratio; and
an insertion processing unit configured to insert a pixel value of an associated image in final insertion images with respect to a pixel value of the pixel specified by the specification unit.

* * * * *